United States Patent
Pan et al.

(10) Patent No.: US 12,432,394 B2
(45) Date of Patent: Sep. 30, 2025

(54) DATA PACKET TRANSMISSION METHOD AND RELATED DEVICE

(71) Applicant: HUAWEI TECHNOLOGIES CO., LTD., Shenzhen (CN)

(72) Inventors: Qi Pan, Beijing (CN); Zhenglei Huang, Shenzhen (CN); Hui Ni, Beijing (CN); Yongcui Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 111 days.

(21) Appl. No.: 18/344,053

(22) Filed: Jun. 29, 2023

(65) Prior Publication Data
US 2023/0345058 A1    Oct. 26, 2023

Related U.S. Application Data

(63) Continuation of application No. PCT/CN2021/143091, filed on Dec. 30, 2021.

(30) Foreign Application Priority Data

Dec. 31, 2020    (CN) .......................... 202011639881.3

(51) Int. Cl.
*H04N 21/2187*    (2011.01)
*H04L 69/16*    (2022.01)
(Continued)

(52) U.S. Cl.
CPC .......... *H04N 21/2187* (2013.01); *H04L 69/16* (2013.01); *H04N 21/234* (2013.01);
(Continued)

(58) Field of Classification Search
CPC ............. H04N 21/2187; H04N 21/234; H04N 21/4402; H04N 21/647; H04N 21/64792; H04W 28/06; H04L 69/16
See application file for complete search history.

(56) References Cited

U.S. PATENT DOCUMENTS

| | | | |
|---|---|---|---|
| 2006/0095943 A1* | 5/2006 | Demircin | H04N 21/23655 725/78 |
| 2011/0199907 A1* | 8/2011 | Zheng | H04L 1/1877 370/235 |

(Continued)

FOREIGN PATENT DOCUMENTS

| | | |
|---|---|---|
| CN | 108289007 A | 7/2018 |
| EP | 2352248 A1 | 8/2011 |
| EP | 3522417 A1 | 8/2019 |

OTHER PUBLICATIONS

3GPP TS 23.501 V15.12.0 (Dec. 2020) 3rd Generation Partnership Project; Technical Specification Group Services and System Aspects; System architecture for the 5G System (5GS); Stage 2 (Release 15), total 244 pages.

(Continued)

*Primary Examiner* — Randy A Flynn
(74) *Attorney, Agent, or Firm* — HAUPTMAN HAM, LLP

(57) ABSTRACT

A data packet transmission method includes receiving, by a first network element, a first data packet of a first service from an application server. The method also includes determining, by the first network element, first sequence information of a second data packet. The second data packet is a to-be-discarded data packet of the first service. The first sequence information indicates a sequence of the second data packet. The method further includes determining, by the first network element, a third data packet. The third data packet includes the first sequence information. The method additionally includes sending, by the first network element, the third data packet to a terminal device.

20 Claims, 10 Drawing Sheets

(51) Int. Cl.
　　　*H04N 21/234*　　(2011.01)
　　　*H04N 21/4402*　 (2011.01)
　　　*H04N 21/647*　　(2011.01)
　　　*H04W 28/06*　　 (2009.01)
(52) U.S. Cl.
　　　CPC ....... *H04N 21/4402* (2013.01); *H04N 21/647* (2013.01); *H04N 21/64792* (2013.01); *H04W 28/06* (2013.01)

(56) References Cited

U.S. PATENT DOCUMENTS

| | | | |
|---|---|---|---|
| 2015/0295828 A1* | 10/2015 | Lan ......................... | H04L 47/30 370/235 |
| 2019/0268445 A1* | 8/2019 | Zhang .................... | H04L 47/27 |

OTHER PUBLICATIONS

International Search Report issued in corresponding International Application No. PCT/CN2021/143091, dated Mar. 8, 2022, pp. 1-13.
Extended European Search Report issued in corresponding European Application No. 21914633.9, dated Mar. 27, 2024, pp. 1-9.

* cited by examiner

DATA PACKET TRANSMISSION METHOD AND RELATED DEVICE

CROSS-REFERENCE TO RELATED APPLICATIONS

This application is a continuation of International Patent Application No. PCT/CN2021/143091, filed on Dec. 30, 2021, which claims priority to Chinese Patent Application No. 202011639881.3, filed on Dec. 31, 2020. The disclosures of the aforementioned applications are hereby incorporated by reference in their entireties.

TECHNICAL FIELD

This application relates to the field of communication technologies, and in particular, to a data packet transmission method and a related device.

BACKGROUND

With development of communication technologies such as 5G, emerging media services such as a high-definition video, a VR (virtual reality) video, and an AR (augmented reality) video are implemented, to implement real-time transmission of a large amount of media data, and reduce a network delay. From a perspective of a network, the media services will be main carried traffic of a future mobile network. User experience on the entire mobile network depends strongly on user experience on the media services. Therefore, it is critical to optimize the user experience on the media services.

Transmission of media data in the media services, for example, transmission of a live media stream, has a high requirement on the network delay. When the network is poor, retransmission of a lost packet of the media data may occur. This may cause freezing when a user watches a live broadcast. During actual application, for this type of media service, when the network deteriorates, the user may be willing to lower a requirement on image quality instead of waiting for buffering caused by the freezing. A plurality of existing media data transmission protocols, such as an RTSP (real time streaming protocol)/RTMP (real time messaging protocol) and an HTTP (hypertext transfer protocol), have sequence preserving performance (also referred to as sorting reliability) for transmission of data packets. These protocols are all based on a TCP (transmission control protocol). In the TCP, sorting reliability of the media data is ensured by using TCP sequence numbers, acknowledge sequence numbers, and the like of the data packets. When the network deteriorates, such sorting reliability also affects continuity and real-time performance of playing the media data. This further affects the user experience on the media services.

SUMMARY

This application provides a data packet transmission method and a related device, so that continuity and real-time performance of a service of a terminal device can be improved according to this application.

A first aspect of this application provides a data packet transmission method. In this method, a first network element may receive a first data packet of a first service from an application server. The first network element determines first sequence information of a second data packet. Then, the first network element determines a third data packet, and sends the third data packet to a terminal device. The second data packet is a to-be-discarded data packet of the first service, the first sequence information indicates a sequence of the second data packet, and the third data packet includes the first sequence information.

In this method, the first network element may re-determine, for the to-be-discarded second data packet of the first service, the third data packet carrying the first sequence information. Because the third data packet carries the first sequence information, after the terminal device receives the third data packet, and when a previous data packet of the second data packet has been decoded, the terminal device may decode the third data packet, and may further decode a following data packet of the third data packet. This avoids freezing of the first service because a following data packet of the second data packet cannot be decoded due to waiting for the second data packet, and improves continuity and real-time performance of the first service.

With reference to the first aspect, in an alternative manner, the second data packet is a TCP packet, and the first sequence information includes a TCP sequence number of the second data packet.

With reference to the first aspect, in another alternative manner, the first sequence information is included in first information, and the first information further includes a source IP address, a source port number, a target IP address, and a target port number.

With reference to the first aspect, in another alternative manner, after the first network element sends the third data packet to the terminal device, the first network element may receive the second data packet, and the first network element discards the second data packet.

With reference to the first aspect, in another alternative manner, the first network element may receive the first sequence information from a second network element. The second network element is the terminal device or the application server.

With reference to the first aspect, in another alternative manner, the first sequence information further includes first indication information, and the first indication information indicates that the second data packet is the to-be-discarded data packet.

With reference to the first aspect, in another alternative manner, the second data packet includes a first target data packet. When the first network element does not receive the first target data packet within a first receiving time limit, or when the first network element does not receive acknowledge information corresponding to the first target data packet from the terminal device within a second receiving time limit, the first network element obtains first sequence information of the first target data packet.

With reference to the first aspect, in another alternative manner, the second data packet includes a first target data packet. The first target data packet includes: a data packet that is of the first service and that is not received by the terminal device within a third receiving time limit, and/or one or more data packets that are sorted first in data packets that are not decoded for the first service when data buffered by the terminal device for the first service is less than a first threshold.

With reference to the first aspect, in another alternative manner, the second data packet further includes a second target data packet determined based on second sequence information of the first target data packet and second indication information of the first target data packet, the second sequence information indicates a sequence of the first target data packet, and the second indication information indicates a coding type corresponding to the first target data packet in the first service.

With reference to the first aspect, in another alternative manner, the first sequence information further includes third indication information, and the third indication information indicates a length of the second data packet.

With reference to the first aspect, in another alternative manner, the third data packet further includes a first checksum. The first network element may further determine the first checksum.

With reference to the first aspect, in another alternative manner, after the first network element sends the third data packet to the terminal device, and when the first network element receives first acknowledge information from the terminal device, or after first duration starting from sending of the third data packet to the terminal device by the first network element, the first network element may further delete the first sequence information from a first record list. The first acknowledge information indicates that the terminal device has received the data packet carrying the first sequence information. The first record list includes sequence information of a data packet discarded by the first network element for the first service.

With reference to the first aspect, in another alternative manner, before the first network element determines the first sequence information of the second data packet, the first network element may further receive the second data packet, send the second data packet to the terminal device, and store the first sequence information of the second data packet in a second record list. The second record list includes sequence information of a data packet that is of the first service and that is received by the first network element.

When the first network element receives acknowledge information corresponding to the second data packet within second duration starting from receiving of the second data packet, the first network element deletes the first sequence information from the second record list. Alternatively, when the first network element does not receive acknowledge information corresponding to the second data packet within second duration starting from receiving of the second data packet, the first network element determines the first sequence information of the second data packet.

With reference to the first aspect, in another alternative manner, before the first network element determines the first sequence information of the second data packet, the first network element may further receive the second data packet. The first network element checks the second data packet. When the check fails, the first network element discards the second data packet.

A second aspect of embodiments of this application provides another data packet transmission method. In this method, a second network element determines first sequence information of a second data packet, and the second network element sends the first sequence information of the second data packet to a first network element. The second data packet is a to-be-discarded data packet of a first service. The first sequence information indicates a sequence of the second data packet. The first sequence information is used to trigger the first network element to determine, in a process of receiving a data packet of the first service from an application server, a third data packet including the first sequence information, and send the third data packet to a terminal device.

In this method, the second network element may determine the first sequence information of the to-be-discarded second data packet, and send the first sequence information to the first network element. Then, the first network element may re-determine, for the to-be-discarded second data packet of the first service, the third data packet carrying the first sequence information. Because the third data packet carries the first sequence information, after the terminal device receives the third data packet, and a previous data packet of the second data packet has been decoded, the terminal device may decode the third data packet, and may further decode a following data packet of the third data packet. This avoids freezing of the first service because a following data packet of the second data packet cannot be decoded due to waiting for the second data packet, and improves continuity and real-time performance of the first service.

With reference to the second aspect, in an alternative manner, the second data packet is a TCP packet, and the first sequence information includes a TCP sequence number of the second data packet.

With reference to the second aspect, in another alternative manner, the first sequence information is included in first information, and the first information further includes a source IP address, a source port number, a target IP address, and a target port number.

With reference to the second aspect, in another alternative manner, in this method, the second network element may further send first indication information to the first network element. The first indication information indicates that the second data packet is the to-be-discarded data packet.

With reference to the second aspect, in another alternative manner, the second data packet includes a first target data packet. When the second network element does not receive the first target data packet within a third receiving time limit, the second network element may obtain first sequence information of the first target data packet. Alternatively, when an amount of buffered data of the first service is less than a first threshold, the second network element may obtain first sequence information of one or more first target data packets that are sorted first in data packets that are not decoded for the first service.

With reference to the second aspect, in another alternative manner, the second data packet further includes a second target data packet determined based on second sequence information and second indication information that are of the first target data packet, the second sequence information indicates a sequence of the first target data packet, and the second indication information indicates a coding type corresponding to the first target data packet in the first service.

With reference to the second aspect, in another alternative manner, the first sequence information further includes third indication information, and the third indication information indicates a length of the second data packet.

A third aspect of this application provides another data packet transmission method. In this method, a terminal device determines first sequence information of a second data packet based on a packet loss policy, and the terminal device sends first acknowledge information to an application server based on the first sequence information. The second data packet is a to-be-discarded data packet of a first service. The first sequence information indicates a sequence of the second data packet. The first acknowledge information indicates that the terminal device has received the data packet carrying the first sequence information.

The terminal device may determine, based on the packet loss policy, the first sequence information of the second data packet discarded for the first service, and send the first acknowledge information to the application server based on the first sequence information. Then, the terminal device decodes a data packet sorted after the second data packet, to reduce freezing of the first service, and ensure continuity and real-time performance of the first service.

With reference to the third aspect, in an alternative manner, after determining the first sequence information based on the packet loss policy, the terminal device may further receive the second data packet carrying the first sequence information, and the terminal device discards the second data packet.

With reference to the third aspect, in another alternative manner, when receiving the second data packet carrying the first sequence information, the terminal device deletes the first sequence information from a third record list. The third record list includes sequence information of a data packet to be discarded by the terminal device for the first service.

With reference to the third aspect, in another alternative manner, the terminal device deletes the first sequence information from a third record list after third duration starting from determining of the first sequence information. The third record list includes sequence information of a data packet to be discarded by the terminal device for the first service.

With reference to the third aspect, in another alternative manner, after determining the first sequence information of the second data packet based on the packet loss policy, the terminal device may further send the first sequence information to a third network element. The first sequence information is used to trigger the third network element to discard the second data packet when receiving the second data packet.

With reference to the third aspect, in another alternative manner, the second data packet is a TCP packet, and the first sequence information includes a TCP sequence number of the second data packet.

With reference to the third aspect, in another alternative manner, the terminal device may obtain first sequence information of a first target data packet when the terminal device does not receive the first target data packet within a third receiving time limit. Alternatively, when an amount of buffered data of the first service is less than a first threshold, the terminal device may obtain first sequence information of one or more first target data packets that are sorted first in data packets that are not decoded for the first service.

With reference to the third aspect, in another alternative manner, the second data packet further includes a second target data packet. The terminal device may further determine the second target data packet based on second sequence information and second indication information that are of the first target data packet. The second sequence information indicates a sequence of the first target data packet. The second indication information indicates a coding type corresponding to the first target data packet in the first service.

With reference to the third aspect, in another alternative manner, the terminal device may further send fourth indication information to the application server. The fourth indication information indicates that the first acknowledge information is sent by the terminal device when the terminal device does not receive the second data packet.

A fourth aspect of embodiments of this application provides a data packet transmission method. In this method, a third network element may receive first sequence information from a terminal device. The third network element receives, from an application server, a third data packet carrying the first sequence information. The third network element discards a second data packet. The first sequence information indicates a sequence of the second data packet, and the second data packet is a to-be-discarded data packet of a first service.

In this method, when receiving the second data packet carrying the first sequence information, the third network element may discard the second data packet based on the first sequence information sent by the terminal device. Because the terminal device no longer needs the second data packet in this case, a third network element discards the second data packet. This avoids a waste of transmission resources caused by transmission of the second data packet.

With reference to the fourth aspect, in an alternative manner, the third network element may further receive a fourth data packet, and mark third sequence information of the fourth data packet in a GTP layer protocol header of the fourth data packet. The third network element sends a marked fourth data packet to an access network device. The third sequence information of the fourth data packet includes information indicating a sequence of the fourth data packet.

With reference to the fourth aspect, in another alternative manner, the third network element may obtain sequence information marked in a GTP layer protocol header of the second data packet, and discard the second data packet when the sequence information marked in the GTP layer protocol header matches the first sequence information.

With reference to the fourth aspect, in another alternative manner, after receiving the first sequence information from the terminal device, and when receiving the second data packet carrying the first sequence information, the third network element deletes the first sequence information from a fourth record list. The fourth record list includes sequence information of a data packet to be discarded by the terminal device for the first service.

With reference to the fourth aspect, in another alternative manner, after receiving the first sequence information from the terminal device, and after fourth duration starting from receiving of the first sequence information, the third network element deletes the first sequence information from a fourth record list. The fourth record list includes sequence information of a data packet to be discarded by the terminal device for the first service.

A fifth aspect of embodiments of this application provides a communication device. The device includes a first transceiver module and a first processing module. The first transceiver module is configured to receive a first data packet of a first service from an application server.

The first processing module is configured to determine first sequence information of a second data packet. The second data packet is a data packet discarded for the first service, and the first sequence information indicates a sequence of the second data packet. The first processing module is further configured to determine a third data packet. The third data packet includes the first sequence information. The first transceiver module is further configured to send the third data packet to a terminal device.

With reference to the fifth aspect, in an alternative manner, the second data packet is a TCP packet, and the first sequence information includes a TCP sequence number of the second data packet.

With reference to the fifth aspect, in another alternative manner, the first sequence information is included in first information, and the first information further includes a source IP address, a source port number, a target IP address, and a target port number.

With reference to the fifth aspect, in another alternative manner, the first transceiver module is further configured to receive the second data packet after sending the third data packet to the terminal device.

The first processing module is further configured to discard the second data packet.

With reference to the fifth aspect, in another alternative manner, the first transceiver module is further configured to receive the first sequence information from a second network element. The second network element is the terminal device or the application server.

The first processing module is configured to obtain the first sequence information from the first transceiver module.

With reference to the fifth aspect, in another alternative manner, the first transceiver module is further configured to receive first indication information from the second network element. The first indication information indicates that the second data packet is a to-be-discarded data packet.

With reference to the fifth aspect, in another alternative manner, the second data packet includes a first target data packet, and the first processing module is configured to:

when the first transceiver module does not receive the first target data packet within a first receiving time limit, or receives acknowledge information corresponding to the first target data packet from the terminal device within a second receiving time limit, obtain first sequence information of the first target data packet.

With reference to the fifth aspect, in another alternative manner, the second data packet includes a first target data packet. The first target data packet includes: a data packet that is of the first service and that is not received by the terminal device within a third receiving time limit, and/or one or more data packets that are sorted first in data packets that are not decoded for the first service when data buffered by the terminal device for the first service is less than a first threshold.

With reference to the fifth aspect, in another alternative manner, the second data packet further includes a second target data packet determined based on second sequence information of the first target data packet and second indication information of the first target data packet, the second sequence information indicates a sequence of the first target data packet, and the second indication information indicates a coding type corresponding to the first target data packet in the first service.

With reference to the fifth aspect, in another alternative manner, the first information further includes third indication information, and the third indication information indicates a length of data in the second data packet.

With reference to the fifth aspect, in another alternative manner, the third data packet further includes a first checksum. The first processing module is further configured to determine the first checksum based on the first information.

With reference to the fifth aspect, in another alternative manner, after the first transceiver module sends the third data packet to the terminal device, the first processing module is further configured to:

when the first transceiver module receives first acknowledge information from the terminal device, or after first duration starting from sending of the third data packet to the terminal device by the first transceiver module, delete the first sequence information from a first record list. The first acknowledge information indicates that the terminal device has received the data packet carrying the first sequence information. The first record list includes sequence information of a data packet discarded by the terminal device for the first service.

With reference to the fifth aspect, in another alternative manner, before the first processing module determines the first sequence information of the second data packet, the first transceiver module is further configured to receive the second data packet, and is further configured to send the second data packet to the terminal device.

The first processing module is further configured to store first information of the second data packet in a second record list. The second record list includes information about a data packet that is of the first service and that is received by the first transceiver module.

The first processing module is further configured to: when the first transceiver module receives acknowledge information corresponding to the second data packet within second duration starting from receiving of the second data packet, delete the first sequence information from the second record list.

Alternatively, the first processing module is configured to: when the first transceiver module receives acknowledge information corresponding to the second data packet within second duration starting from receiving of the second data packet, determine the first sequence information of the second data packet.

With reference to the fifth aspect, in another alternative manner, before the first processing module determines the first sequence information of the second data packet, the first transceiver module is further configured to receive the second data packet.

The first processing module is further configured to: check the second data packet, and if the check fails, discard the second data packet.

A sixth aspect of embodiments of this application provides another communication device. The device includes at least a second processing module and a second transceiver module.

With reference to the sixth aspect, in an alternative manner, the second processing module is configured to determine first sequence information of a second data packet. The second data packet is a to-be-discarded data packet of a first service, and the first sequence information indicates a sequence of the second data packet.

The second transceiver module is configured to send the first sequence information of the second data packet to a first network element. The first sequence information is used to trigger the first network element to determine, in a process of receiving a data packet of the first service from an application server, a third data packet including the first sequence information and send the third data packet to a terminal device.

With reference to the sixth aspect, in another alternative manner, the second data packet is a TCP packet, and the first sequence information includes a TCP sequence number of the second data packet.

With reference to the sixth aspect, in another alternative manner, the first sequence information is included in first information, and the first information further includes a source IP address, a source port number, a target IP address, and a target port number.

With reference to the sixth aspect, in another alternative manner, the second transceiver module is further configured to send first indication information to the first network element. The first indication information indicates that the second data packet is a discarded data packet.

With reference to the sixth aspect, in another alternative manner, the second data packet includes a first target data packet, and the second processing module is configured to:

when the second transceiver module does not receive the first target data packet within a third receiving time limit, obtain first sequence information of the first target data packet; or when an amount of data buffered by the communication device for the first service is less than a first threshold, obtain first sequence information of one or more first target data packets that are sorted first in data packets that are not decoded for the first service.

With reference to the sixth aspect, in another alternative manner, the second data packet further includes a second target data packet determined based on second sequence information and second indication information that are of the first target data packet, the second sequence information indicates a sequence of the first target data packet, and the second indication information indicates a coding type corresponding to the first target data packet in the first service.

With reference to the sixth aspect, in another alternative manner, the first information further includes third indication information, and the third indication information indicates a length of the second data packet.

A seventh aspect of embodiments of this application provides a terminal device. The device includes a third processing module and a third transceiver module.

The third processing module is configured to determine first sequence information of a second data packet based on a packet loss policy. The second data packet is a to-be-discarded data packet of a first service, and the first sequence information indicates a sequence of the second data packet.

The third transceiver module is configured to send first acknowledge information to an application server based on the first sequence information. The first acknowledge information indicates that the terminal device has received the data packet carrying the first sequence information.

With reference to the seventh aspect, in an alternative manner, after the third processing module determines the first sequence information of the second data packet based on the packet loss policy, the third transceiver module is further configured to receive the second data packet carrying the first sequence information.

The third processing module is further configured to discard the second data packet.

With reference to the seventh aspect, in another alternative manner, the third processing module is further configured to: when the third transceiver module receives the second data packet carrying the first sequence information, or after third duration starting from determining of the first sequence information by the third processing module, delete the first sequence information from a third record list.

The third record list includes information about a data packet discarded by the terminal device for the first service.

With reference to the seventh aspect, in another alternative manner, after the third processing module determines the first sequence information of the second data packet based on the packet loss policy, the third transceiver module is further configured to send the first sequence information to a third network element. The first sequence information is used to trigger the third network element to discard the second data packet when receiving the second data packet.

With reference to the seventh aspect, in another alternative manner, the second data packet is a TCP packet, and the first sequence information includes a TCP sequence number of the second data packet.

With reference to the seventh aspect, in another alternative manner, the second data packet includes a first target data packet, and the third processing module is configured to:

when the third transceiver module does not receive the first target data packet within a third receiving time limit, obtain first sequence information of the first target data packet; or when an amount of data buffered by the terminal device for the first service is less than a first threshold, obtain first sequence information of one or more first target data packets that are sorted first in data packets that are not decoded for the first service.

With reference to the seventh aspect, in another alternative manner, the second data packet further includes a second target data packet, and the third processing module is further configured to:

determine the second target data packet based on second sequence information and second indication information that are of the first target data packet, where the second sequence information indicates a sequence of the first target data packet, and the second indication information indicates a coding type corresponding to the first target data packet in the first service.

With reference to the seventh aspect, in another alternative manner, the third transceiver module is further configured to send fourth indication information to the application server. The fourth indication information indicates that the first acknowledge information is sent by the terminal device when the terminal device does not receive the second data packet.

An eighth aspect of embodiments of this application provides another communication device. The device includes a fourth transceiver module and a fourth processing module.

The fourth transceiver module is configured to receive first sequence information from a terminal device. The first sequence information indicates a sequence of a second data packet, and the second data packet is a to-be-discarded data packet of a first service.

The fourth transceiver module is further configured to receive, from an application server, the second data packet carrying the first sequence information.

The fourth processing module is configured to discard the second data packet.

With reference to the eighth aspect, in an alternative manner, the fourth transceiver module is further configured to receive a fourth data packet.

The fourth processing module is further configured to mark third sequence information of the fourth data packet in a GTP layer protocol header of the fourth data packet. The third sequence information of the fourth data packet includes information indicating a sequence of the fourth data packet.

The fourth transceiver module is further configured to send a marked fourth data packet to an access network device.

With reference to the eighth aspect, in another alternative manner, the fourth processing module is configured to:

obtain sequence information marked in a GTP layer protocol header of the second data packet, and discard the second data packet when the information marked in the GTP layer protocol header matches the first sequence information.

With reference to the eighth aspect, in another alternative manner, after the fourth transceiver module receives the first sequence information from the terminal device, the fourth processing module is further configured to:

when the fourth transceiver module receives the second data packet carrying the first sequence information, or after fourth duration starting from receiving of the first sequence information by the fourth transceiver module, delete the first sequence information from a fourth record list.

The fourth record list includes sequence information of a data packet discarded by the terminal device for the first service.

A ninth aspect of this application provides another communication device. The communication device may include a processor, a memory, and a communication interface. The processor, the memory, and the communication interface are connected to each other. The communication interface is configured to receive and send data. The memory is configured to store the foregoing program. The processor is configured to invoke the program stored in the memory. The program is executed by a computer to perform the data packet transmission method according to any one of the first aspect and the possible implementations of the first aspect, perform the data packet transmission method according to any one of the second aspect and the possible implementations of the second aspect, or perform the data packet transmission method according to any one of the fourth aspect and the possible implementations of the fourth aspect. The processor and the memory may be physically independent units, or the memory may be integrated with the processor.

A tenth aspect of this application provides another terminal device. The terminal device may include a processor, a memory, and a communication interface. The processor, the memory, and the communication interface are connected to each other. The communication interface is configured to receive and send data. The memory is configured to store the foregoing program. The processor is configured to invoke the program stored in the memory. The program is executed by a computer to perform the data packet transmission method according to any one of the third aspect and the possible implementations of the third aspect. The processor and the memory may be physically independent units, or the memory may be integrated with the processor.

An eleventh aspect of this application provides a computer-readable medium. The computer-readable medium stores instructions. When the instructions are run on a computer, the computer is enabled to perform the data packet transmission method according to any one of the first aspect and the possible implementations of the first aspect, perform the data packet transmission method according to any one of the second aspect and the possible implementations of the second aspect, perform the data packet transmission method according to any one of the third aspect and the possible implementations of the third aspect, or perform the data packet transmission method according to any one of the fourth aspect and the possible implementations of the fourth aspect.

A twelfth aspect of this application provides a computer program product. The computer program product includes computer program code. When the computer program code is run on a computer, the computer is enabled to perform the method according to any one of the first aspect and the possible implementations of the first aspect, perform the data packet transmission method according to any one of the second aspect and the possible implementations of the second aspect, perform the data packet transmission method according to any one of the third aspect and the possible implementations of the third aspect, or perform the data packet transmission method according to any one of the fourth aspect and the possible implementations of the fourth aspect.

A thirteenth aspect of this application provides a chip. The chip includes a processor and a communication interface. The processor is coupled to the communication interface, and is configured to implement the data packet transmission method provided according to any one of the first aspect or the optional implementations, implement the data packet transmission method according to any one of the second aspect and the possible implementations of the second aspect, perform the data packet transmission method according to any one of the third aspect and the possible implementations of the third aspect, or perform the data packet transmission method according to any one of the fourth aspect and the possible implementations of the fourth aspect.

BRIEF DESCRIPTION OF DRAWINGS

To describe the technical solutions in embodiments of this application more clearly, the following briefly describes the accompanying drawings for embodiments. It is clear that the accompanying drawings in the following description show merely some embodiments of this application, and a person of ordinary skill in the art may derive other drawings from these accompanying drawings without creative efforts.

DESCRIPTION OF EMBODIMENTS

The following clearly describes the technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

Figure 1:
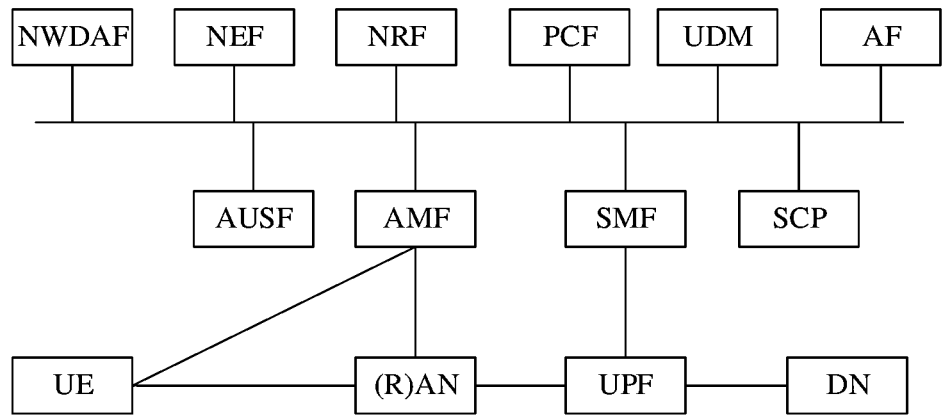
FIG. 1 is a schematic diagram of an architecture of a 5G system according to an embodiment of this application.

FIG. 1 is a schematic diagram of an architecture of a 5G system according to an embodiment of this application. The 5G system includes an access network and a core network. Network elements included in the access network are different from network elements included in the core network. For example, the network elements in the access network include a (R)AN (((radio) access network) device. UE (User Equipment, terminal device) may be connected to the core network via the (R)AN device. The network elements in the core network include a plurality of network function (NF) network elements such as an AMF (access and mobility management function) network element, an SMF (session management function) network element, a PCF (policy control function) network element, a UPF (user plane function) network element, an AUSF (authentication server function) network element, an NWDAF (network data analytics function) network element, and an NEF network element. The core network may be connected to a DN (data network), and different AF (application function) network elements may be included in the DN, to provide different application functions for the core network.

The following separately describes network elements or devices that may be mentioned in this application.

The UE may include a handheld device, a vehicle-mounted device, a wearable device, a computing device, or another processing device connected to a wireless modem that has functions of media playing and wireless communication, and a terminal device in any form in a future communication network.

The (R)AN device is an access network device, is located between the UE and the core network, and may provide a network access function for the terminal device.

The AMF network element may have functions such as UE registration management, reachability detection, and SMF network element selection, may transmit an SM (session management) message between the UE and the SMF, and the like.

The PCF network element may function as a policy decision point, and provide rules such as a service data flow and application detection, gate control, QoS (quality of service), and flow-based charging control.

The SMF network element may perform session management (for example, session establishment, modification, and deletion), IP address allocation and management of the UE, UPF node selection, and the like.

The UPF network element may route and forward a data packet, serve as a mobility anchor inside and outside a system, serve as an uplink classifier to support routing of a service flow to a data network, serve as a branch point to support a multi-homed PDU (protocol data unit) session, and the like.

The NEF network element may support exposure of a capability and time of the core network, for example, third-party edge computing and a function supported by the AF network element.

A UDR (unified data warehouse) network element provides functions such as storage and retrieval of subscription data for a UDM (unified data management) network element, storage and retrieval of policy data for the PCF network element, and storage and retrieval of a structured service.

The AF network element may interact with a network function in the core network to provide a service, for example, affect service flow routing, support access network capability exposure, and support policy control.

An AS (application server) device is a server that may provide an application services For example, the application server may include a media server, and the media server may provide services such as management and download of media data.

The following describes impact on continuity and real-time performance of a media playing service by using sequence preserving performance of a data packet in the TCP as an example with reference to a process from sending of a media data packet by a media server to decoding of the media data packet by a terminal device.

When the media data packet is sent from the media server, the media data packet carries a corresponding TCP sequence number. Within a sending time window, the media server may send a specific quantity of media data packets to the terminal device based on a sequence of TCP sequence numbers (for example, send the media data packets in ascending order of the TCP sequence numbers). After receiving the media data packets, the terminal device sequentially delivers the media data packets from a transmission control layer to an application layer based on the sequence of the TCP sequence numbers, and performs processing such as decoding and displaying on the media data packets (for example, corresponding to the media server, delivers the media data packets to the application layer in ascending order of the TCP sequence numbers). In addition, the terminal device sends an acknowledge sequence number to the media server for a received media data packet, so that the media server acknowledges that the terminal device has successfully received the sent media data packet, and continues to send an unsent media data packet to the terminal device.

However, in a process of transmitting these media data packets to the terminal device, due to factors such as different transmission paths, a sequence in which the media data packets arrive at the terminal device may not be completely consistent with the sequence of the TCP sequence numbers of the media data packets. For example, if the media server sends the media data packets in ascending order of the TCP sequence numbers, the terminal device may not receive the media data packets strictly in ascending order of the TCP sequence numbers. In the TCP protocol, the terminal device delivers the media data packets to the application layer strictly based on the sequence of the TCP sequence numbers. Assuming that a media data packet whose TCP sequence number is in the middle is lost due to a poor network condition, even after a subsequent media data packet arrives, the terminal device still waits for the arrival of the media data packet arranged in the middle. Because the media server cannot receive an acknowledge sequence number of the terminal device for the media data packet arranged in the middle within a period of time, the media server resends the media data packet to the terminal device. Then, the terminal device sequentially delivers subsequent data packets to the application layer only after receiving the resent media data packet and delivering the resent media data packet to the application layer. In this case, due to loss of the media data packet arranged in the middle, the terminal device cannot continuously perform processing such as decoding and displaying even after receiving the subsequent media data packet, resulting in a freezing phenomenon of media playback.

Figure 2:
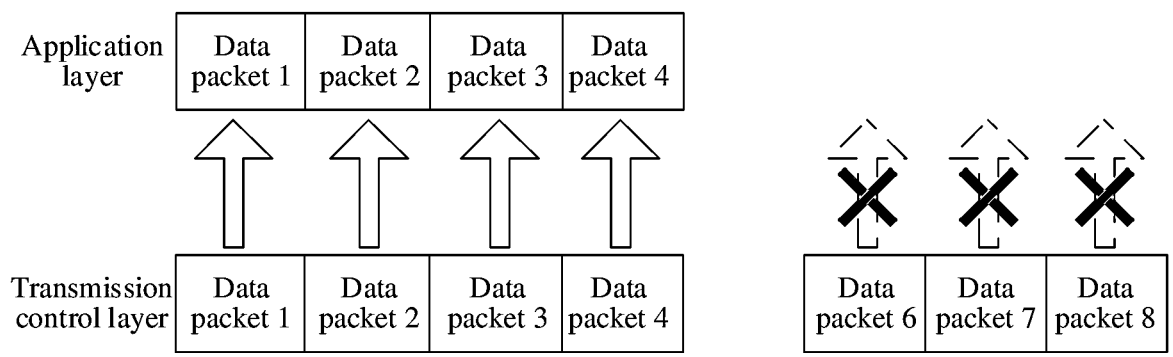
FIG. 2 is a schematic diagram of processing a TCP-based media data packet according to an embodiment of this application.

FIG. 2 is a schematic diagram of processing a TCP-based media data packet according to an embodiment of this application. Sequence preserving performance of media data packets in the TCP protocol may be described with reference to an example in FIG. 2. In the example in FIG. 2, it is assumed that the media server sequentially transmits eight media data packets to the terminal device based on values of TCP sequence numbers (where it is assumed that lengths of data in the data packets are all 10). The data packets are a data packet 1 (whose TCP sequence number is 11), a data packet 2 (whose TCP sequence number is 21), a data packet 3 (whose TCP sequence number is 31), a data packet 4 (whose TCP sequence number is 41), a data packet 5 (whose TCP sequence number is 51), a data packet 6 (whose TCP sequence number is 61), a data packet 7 (whose TCP sequence number is 71), and a data packet 8 (whose TCP sequence number is 81). The data packet 1 to the data packet 4 and the data packet 6 to the data packet 8 are all normally received by the terminal device, but the data packet 5 is not received by the terminal device due to a network. The terminal device may sequentially deliver the data packet 1, the data packet 2, the data packet 3, and the data packet 4 from the transmission control layer to the application layer for processing such as decoding and displaying. Because the data packet 5 is not received, the terminal device 5 waits for arrival of the data packet 5. In addition, the data packet 6 to the data packet 8 are not delivered to the application layer for processing such as decoding and displaying either. If the data packet 5 does not arrive and is not decoded after media data corresponding to the data packet 4 is displayed, waiting for the data packet 5 causes freezing of media playback. Continuity and real-time performance of media playback are affected.

A data packet transmission method provided in embodiments of this application is applied to a scenario in which an application server sends data packets in a specific sequence to a terminal device. The sequence of the data packets is first briefly described. The sequence of the data packets may be a sequence attribute that already exists before the data packets are sent from the application server, for example, may be a sequence attribute defined by the application server.

In a specific implementation, before the data packets are sent, the application server may divide data packets for a data stream of a service, and perform processing such as encoding, compression, and packaging on the divided data stream, to obtain data packets. A sequence of the data packets may be corresponding to a sequence of data in the data packet in an original data stream, or corresponding to a sequence in which the data packets are output from an encoder. For example, for a video data stream, data sampled within every 0.33 ms sampling duration (sampling based on video playback duration) may be encoded into 20 data packets. In this case, 20 data packets obtained through sampling at first 0.33 ms are previous to 20 data packets obtained through sampling at last 0.33 ms. For the 20 data packets obtained through sampling within 0.33 ms, a sequence of the data packets may be the same as a sequence of the data packets output from the encoder.

The sequence of the data packets sent by the application server may alternatively be defined by another subject in another manner. For example, data packets obtained after being processed by the another subject are stored in the application server and have a specific sequence, and the application server may send the data packets to the terminal device in the sequence. Other manners are not described herein.

Further, the application server may indicate the sequence of the data packets by using specific information, for example, may identify the sequence of the data packets by using digits, and a smaller digit indicates a position nearer to the front. Further, to prevent excessive resources from being occupied by an excessively large sequence of magnitude of the digit, a digit indicating a sequence of a data packet may be limited to a specific range, and the digits indicating the sequence of the data packets sequentially increases within the range as the data packets are arranged at the end. After a largest digit within the range is occupied by the data packet, the digits within the range may be cyclically and sequentially used from the smallest digit.

Figure 3A:
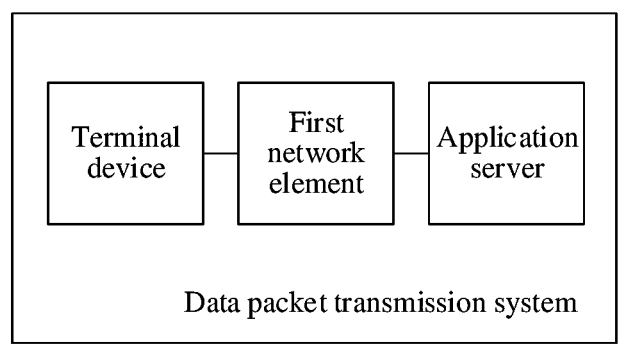
FIG. 3a is a schematic diagram of an architecture of a data packet transmission system according to an embodiment of this application.
Figure 3B:
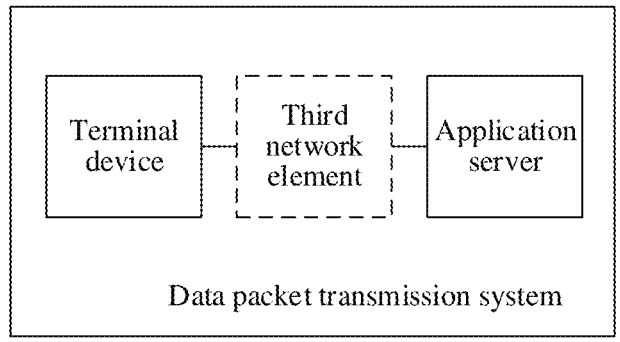
FIG. 3b is a schematic diagram of an architecture of another data packet transmission system according to an embodiment of this application.

With reference to FIG. 3*a* and FIG. 3*b*, the following describes a system architecture used to implement the data packet transmission method provided in this application, and a data packet transmission method provided in embodiments of this application. First, FIG. 3*a* is a schematic diagram of an architecture of a data packet transmission system according to an embodiment of this application. The system architecture may be an optional system architecture for implementing the data packet transmission method in embodiments of this application. As shown in FIG. 3*a*, the system may include at least a terminal device, an application server, and a first network element.

The terminal device may also be referred to as an access terminal, a terminal, a subscriber unit, a subscriber station, a mobile station, a remote station, a remote terminal, a mobile device, a user terminal, a wireless network device, a user agent, a user apparatus, or the like. The terminal device may be a mobile phone, a tablet computer, a vehicle-mounted device, a wearable device, a terminal device in an internet of things or an internet of vehicles, or the like, or a terminal device having a specific media data transmission function in any form in a future communication network. The application server may be a server that transmits a data packet of a service to the terminal device. The first network element may be a network element that is in a core network and that has a routing function for a data packet sent by the application server. For example, the first network element may be a UPF network element, an access network device, or the like in a 5G core network.

Based on the system structure shown in FIG. 3*a*, the data packet transmission method in this application may be implemented. For example, in an implementation, in a process in which the first network element receives a data packet of a first service, the first network element may determine first sequence information of a second data packet. The second data packet is a to-be-discarded data packet of the first service. The first sequence information indicates a sequence of the second data packet. Then, the first network element determines a third data packet carrying the first sequence information, and sends the determined third data packet to the terminal device.

In this system architecture, the first network element may re-determine, for the to-be-discarded second data packet of the first service, the third data packet carrying the first sequence information. Because the third data packet carries the first sequence information, after the terminal device receives the third data packet, and when a previous data packet of the second data packet has been decoded, the terminal device may decode the third data packet, and may further decode a following data packet of the third data packet. This avoids freezing of the first service because a following data packet of the second data packet cannot be decoded due to waiting for the second data packet, and improves continuity and real-time performance of the first service.

FIG. 3b is a schematic diagram of an architecture of another data packet transmission system according to an embodiment of this application. The system architecture may be another optional system architecture for implementing the data packet transmission method in embodiments of this application. As shown in FIG. 3b, the system may include at least a terminal device and an application server, and optionally, may further include a third network element.

The terminal device may also be referred to as an access terminal, a terminal, a subscriber unit, a subscriber station, a mobile station, a remote station, a remote terminal, a mobile device, a user terminal, a wireless network device, a user agent, a user apparatus, or the like. The terminal device may be a mobile phone, a tablet computer, a vehicle-mounted device, a wearable device, a terminal device in an internet of things or an internet of vehicles, or the like, or a terminal device having a specific media data transmission function in any form in a future communication network. The application server may be a server that transmits a data packet of a service to the terminal device. The third network element may be a network element that is in a core network or an access network and that has a routing or sending function for a data packet sent by the application server. For example, the third network element may include a UPF network element in a 5G core network, or may include an access network device in the access network.

Based on the system structure shown in FIG. 3b, the data packet transmission method in this application may be implemented. For example, in an implementation, the terminal device determines first sequence information of a second data packet based on a packet loss policy. The second data packet is a to-be-discarded data packet of a first service. The first sequence information indicates a sequence of the second data packet. The terminal device sends first acknowledge information to the application server based on the first sequence information. The first acknowledge information indicates that the terminal device has received a data packet carrying the first sequence information.

In this system architecture, the terminal device may determine, based on the packet loss policy, the first sequence information of the second data packet discarded for the first service, and send the first acknowledge information to the application server based on the first sequence information. Then, the terminal device decodes a data packet sorted after the second data packet, to reduce freezing of the first service, and ensure continuity and real-time performance of the first service.

The following describes the data packet transmission method provided in embodiments of this application with reference to FIG. 4 to FIG. 9. In an implementation scenario, the data packet transmission method may be applied to a process in which a media server sends a media data packet of first media to a terminal device via a core network element (for example, a UPF network element). The method may be implemented in one or more of four network elements/devices: the core network element, an access network device, an application server, or the terminal device. This is described in the following method embodiments.

A first service may include but is not limited to an audio media service, a video media service, an image media service, an online game service, a text service, a file service, and the like. For example, the first service may be applied to a process of transmission of a media data packet of a live video or an on-demand video. For another example, the first service may be applied to a process of transmission of a media data packet of a live radio online music. Optionally, the first service may be a service for which a user has a high requirement on a data delay and has fault tolerance on data quality. According to the data packet transmission method in embodiments of this application, continuity and real-time performance of the first service can be improved.

It should be understood that, in specific use of the data packet transmission method, the first service may be one of a plurality of services of the terminal device, or may include a plurality of services of the terminal device. The data packet transmission method in embodiments of this application may be performed for a data packet of one first service in the plurality of services of the terminal device, or the data packet transmission method in embodiments of this application may be performed by simultaneously by using the plurality of services of the terminal device as the first service.

In an example, the terminal device is performing an online audio playback service and an online game service at the same time. The first service may be the online audio playback service. According to the data packet transmission method in embodiments of this application, real-time performance and continuity of an online music playback service of the terminal device can be ensured. Alternatively, the first service may be the online game service. According to the data packet transmission method provided in embodiments of this application, real-time performance and continuity of the online game service of the terminal device can be ensured. Alternatively, the first service may include the online video service and the online game service. According to the data packet transmission method provided in embodiments of this application, real-time performance and continuity of the online audio playback service and the online game service of the terminal device can be ensured.

It should be noted that network elements in embodiments of this application may be physical network devices or virtual network devices. A connection relationship between devices in embodiments of this application may be a direct connection or an indirect connection, or may be a wired connection or a wireless connection. Sending of a media data packet in embodiments of this application may be direct sending or indirect sending through at least one device. This is not limited in this application.

Figure 4:
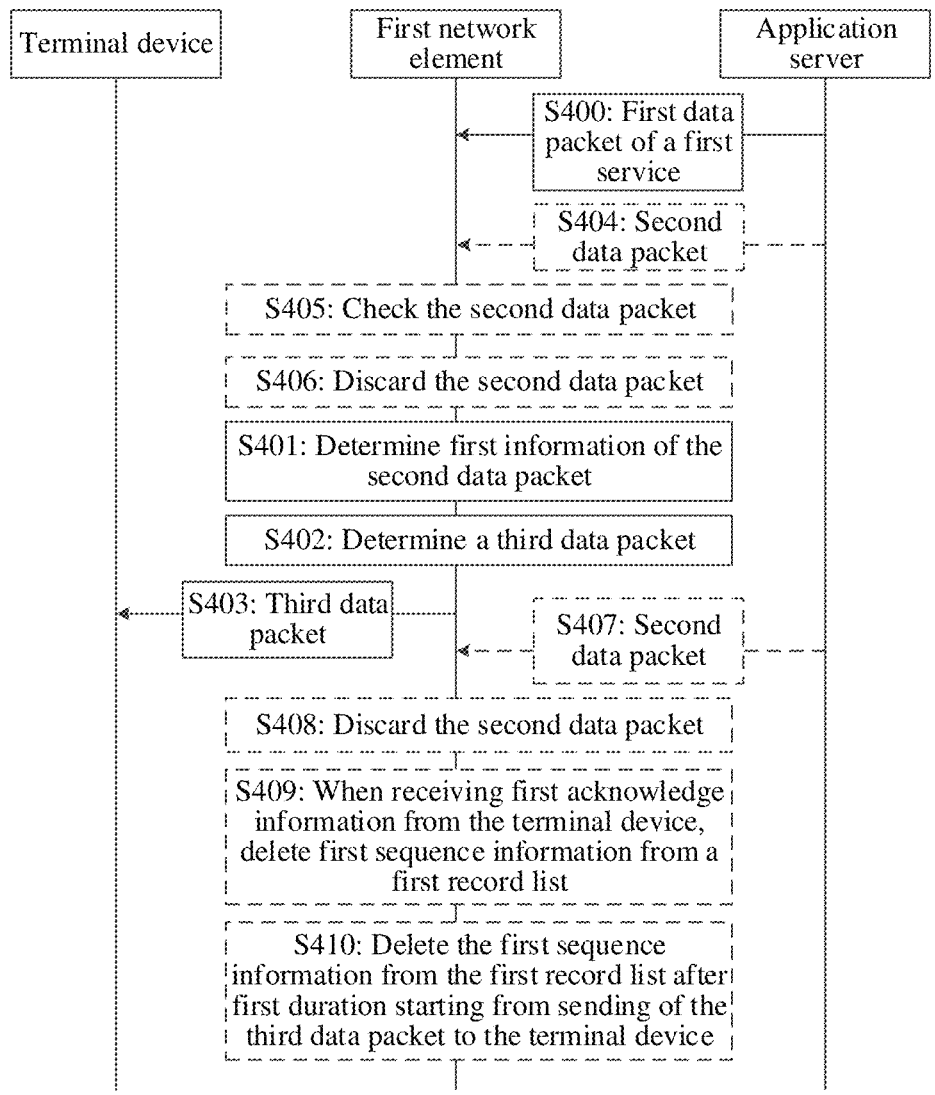
FIG. 4 is a schematic flowchart of a data packet transmission method according to an embodiment of this application.

FIG. 4 is a schematic flowchart of a data packet transmission method according to an embodiment of this application. In an implementation, the data packet transmission method corresponding to FIG. 4 may be implemented based on the data packet transmission system corresponding to FIG. 3a. The method is related to interaction between a first network element and a terminal device. The first network element may be the first network element shown in FIG. 3a, may be a core network element such as a UPF network element, or may be an access network device. The terminal device may be the terminal device shown in FIG. 3a. For related descriptions, refer to the related descriptions of FIG. 3a. As shown in FIG. 4, the data packet transmission method may include at least steps S400 to S403.

S400: The first network element receives a first data packet of a first service from an application server.

The data packet transmission method provided in this embodiment of this application may be applied to a process in which the first network element receives the data packet of the first service from the application server. The first data packet is any data packet that is of the first service and that is received by the first network element from the application server.

S401: The first network element determines first sequence information of a second data packet.

The second data packet is a data packet discarded (dropped) for the first service. The discarded data packet may indicate that data packet processing related to the first service is no longer performed on the data packet. For example, if the second data packet is a data packet discarded by the first network element, it may indicate that the first network element does not receive the second data packet; after receiving the second data packet, the first network element immediately deletes the second data packet, and does not continue to route the second data packet; after receiving the second data packet, the first network element does not add the second data packet to a data packet sending queue, and deletes the second data packet after a period of time, or the like. For another example, if the second data packet is a data packet discarded by the terminal device, it may indicate that the terminal device does not receive the second data packet; after receiving the second data packet, the terminal device immediately deletes the second data packet; after receiving the second data packet, the terminal device does not perform processing such as decoding on the second data packet, and deletes the second data packet after a period of time, or the like. For another example, if the second data packet is a data packet discarded by the application server, it may indicate that the application server does not receive acknowledge information from the terminal device and does not send the data packet to the terminal device again, or the like.

The first sequence information indicates a sequence of the second data packet. In a manner, the second data packet is a TCP packet, and the first sequence information may include a TCP sequence number. If the data packet of the first service is a data packet with a fixed data length, a TCP sequence number of the second data packet may indicate the sequence of the second data packet. Further, if a length of data included in the data packet of the first service is uncertain, the first sequence information may further include a data length of the second data packet. In another manner, the first sequence information may include a QUIC (quick UDP internet connection) sequence number. In still another manner, the first sequence information may be sequence information in an application layer header, for example, a sequence number in an RTP (real-time transport protocol) application layer header.

Optionally, the first sequence information may be included in first information. For example, the first information may further include a source IP address, a source port number, a target IP address, and a target port number of the second data packet, and may further include a transport layer protocol. For another example, the first information may include third indication information, and the third indication information may indicate a length of an entire data packet in the second data packet. Other information that may be included in the first information is further described below. It should be understood that, in an implementation, if the data packet of the first service is a data packet with an uncertain data length, the third indication information in the first information may alternatively be understood as a part of the first sequence information.

Figure 5A:
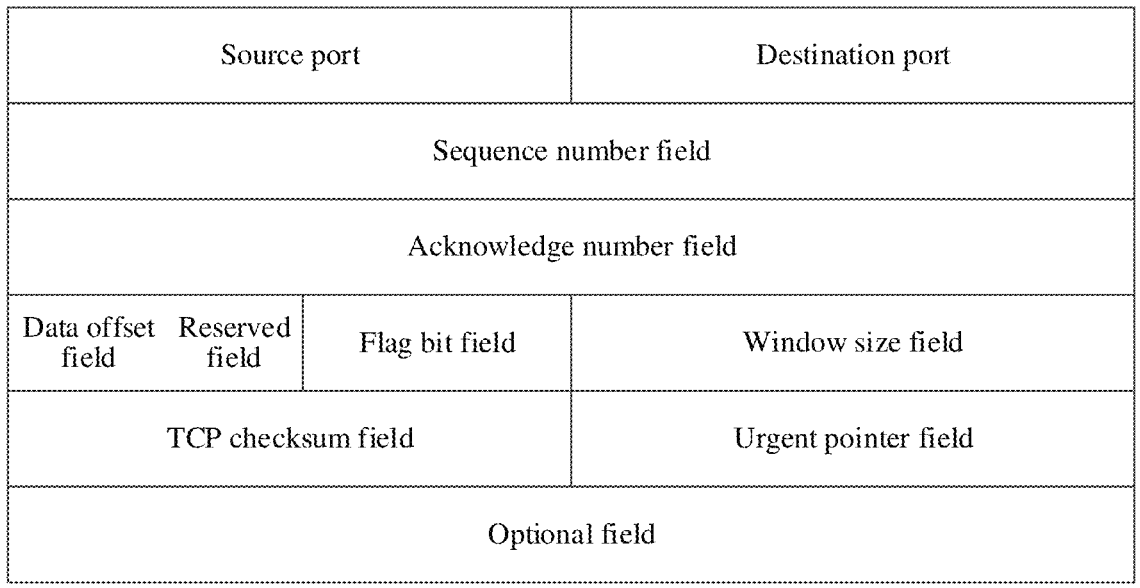
FIG. 5a is a schematic diagram of a format of a TCP layer protocol header according to an embodiment of this application.
Figure 5B:
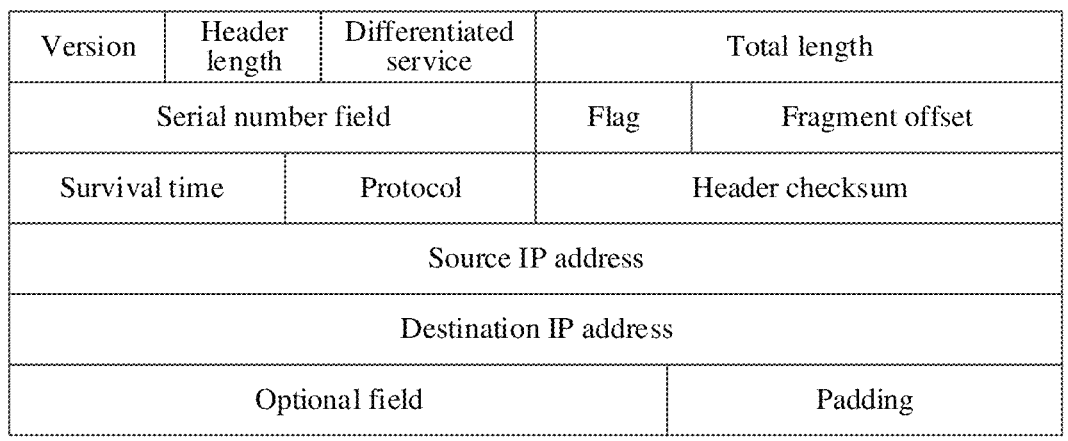
FIG. 5b is a schematic diagram of a format of an IPv4 packet header information according to an embodiment of this application.

In an implementation, first information of the second data packet may be included in protocol header information of the second data packet, and different protocol layers may have different protocol header information. For example, if the second data packet is a TCP packet, the first sequence information may be included in TCP protocol header information, and the first sequence information may include a TCP sequence number. Further, if the length of the data included in the data packet of the first service is uncertain, the first information of the second data packet may further include the third indication information, and the third indication information indicates the length of the second data packet. For details, refer to FIG. 5a and FIG. 5b. FIG. 5a is a schematic diagram of a format of a TCP layer protocol header according to an embodiment of this application. FIG. 5a shows fields that may be included in transmission control layer header information. The first sequence information included in the first information may be a TCP sequence number corresponding to a data packet in the TCP layer protocol header information. FIG. 5b is a schematic diagram of a format of IPv4 packet header information according to an embodiment of this application. In FIG. 5b, the third indication information included in the first information may be information in a total length field in the IPv4 packet header information. The first information may further include information such as a source port and a destination port in transmission control layer protocol header information, and may further include information such as a source IP address and a destination IP address in the IPv4 packet header information.

The first sequence information determined by the first network element may include first sequence information of one second data packet, or may include first sequence information of a plurality of second data packets. There are a plurality of alternative implementations in which the first network element determines the first sequence information. For example, two alternative implementations in which the first network element determines the first sequence information and the first network element receives the first sequence information from a second network element are described in detail.

In a first alternative implementation, the first network element may determine the first sequence information. Optionally, a specific packet loss policy may be transmitted to the first network element in advance, or a specific packet loss policy is preconfigured in the first network element. Then, the first network element may determine the first sequence information based on the packet loss policy. It should be understood that the packet loss policy is intended to ensure real-time performance and continuity of the first service by moderately sacrificing service quality. The packet loss policy may indicate to perform packet loss for a data packet at a packet granularity, perform packet loss for a data packet at a frame granularity, perform packet loss for a data packet at a group of pictures (GOP) granularity, or perform packet loss for a data packet at a file granularity, or the like. A specific policy in the packet loss policy is not limited herein.

In a specific manner, when the first network element does not receive the second data packet within a first receiving time limit, the first network element obtains the first sequence information of the second data packet. A data packet receiving time limit may be preset in the first network element for the data packet of the first service. A data packet that is not received within the corresponding data packet receiving time limit is the second data packet, and the first network element may obtain the first sequence information of the second data packet.

It should be noted that a plurality of data packets of the first service may have a same data packet receiving time limit. For example, for a data packet 1 received by the first network element, none of a specific quantity of adjacent data packets following the data packet 1 is received by the first network element. A data packet receiving time limit corresponding to the specific quantity of data packets may be fifth duration starting from receiving of the data packet 1 by the first network element. Alternatively, data packets of the first service may have different data packet receiving time limits. For example, for the first receiving time limit corresponding to the second data packet, the first network element may use, as the first receiving time limit corresponding to the second data packet, fifth duration starting from receiving of a previous data packet of the second data packet. Alternatively, the first network element may use, as the first receiving time limit corresponding to the second data packet, sixth duration starting from a moment at which the previous data packet of the second data packet is sent. This is not limited. The previous data packet of the second data packet may be a data packet that is previous to the second data packet and that is adjacent to the second data packet, or may be a data packet that is previous to the second data packet and that is at an interval of a specific quantity of data packets from the second data packet, or the like. This is not limited. For example, for the data packet 1, a TCP sequence number of the data packet 1 is 101, a data length is 100, a previous data packet of the data packet 1 is a data packet 2, a TCP sequence number of the data packet 2 is 51, and a length is 50. The first network element starts timing when receiving the data packet 2. If the data packet 1 is not received when timing duration reaches the fifth duration, the first network element obtains first sequence information of the data packet 1.

In another specific implementation, when the first network element does not receive acknowledge information corresponding to the second data packet from the terminal device within a second receiving time limit, the first network element obtains the first sequence information of the second data packet. Acknowledge information corresponding to a data packet sent by the terminal device indicates that the terminal device receives the data packet. For example, when the data packet is a TCP packet, first sequence information of the data packet may include the TCP sequence number of the data packet. After receiving the data packet, the terminal device may reply with an ACK (acknowledge character) based on the TCP sequence number of the received data packet. The ACK is the acknowledge information corresponding to the data packet. There may be a plurality of specific implementations in which the terminal device replies with the ACK for the data packet. For example, the terminal device may separately reply with an ACK for each received data packet, or may reply with an ACK for data packets that are consecutively received in a period of time. A specific implementation is not limited. A receiving time limit may be preset in the first network element for the acknowledge information corresponding to the data packet of the first service. A data packet whose acknowledge information is not received within the receiving time limit of the acknowledge information is the second data packet, and the first network element may obtain the first sequence information of the second data packet.

It should be noted that acknowledge information of the data packets of the first service may have different receiving time limits. For example, for the second receiving time limit of the acknowledge information corresponding to the second data packet, the first network element may use the second duration starting from receiving of the second data packet as the receiving time limit of the acknowledge information corresponding to the second data packet; the first network element may use seventh duration starting from sending of the second data packet to the terminal device as the receiving time limit of the acknowledge information corresponding to the second data packet; or the first network element may use eighth duration starting from receiving of acknowledge information corresponding to the previous data packet of the second data packet as the receiving time limit of the acknowledge information corresponding to the second data packet. This is not limited. For the previous data packet, refer to the descriptions of the previous data packet in the first optional manner. Details are not described herein again. For example, for a data packet 3, a TCP sequence number of the data packet 3 is 101, and a packet length is 100. The first network element starts timing when receiving the data packet 3. When the first network element does not receive acknowledge information corresponding to the data packet 3 when timing duration reaches the second duration, the first network element obtains first sequence information of the data packet 3.

Further, in a process in which the first network element determines the first sequence information, the first network element may first determine the discarded second data packet, and obtain the first sequence information of the second data packet; or may directly obtain the first sequence information. Optionally, in the latter manner, while obtaining the first sequence information, the first network element may determine that the second data packet corresponding to the first sequence information is a discarded data packet.

In some embodiments, the first network element may record identification information of the second data packet discarded for the first service. If the recorded identification information of the second data packet is other information than the first sequence information of the second data packet, the first network element may determine, based on the recorded identification information, specific data packets that are the discarded second data packets, and further obtain the first sequence information of the second data packets. If the recorded identification information of the second data packet is the first sequence information of the second data packet, the first network element may directly obtain the first sequence information by using the recorded first sequence information. In addition, because the first sequence information may indicate the sequence of the second data packet, the first sequence information may uniquely identify the second data packet. In this case, the first network element may determine that the second data packet corresponding to the first sequence information is a data packet discarded for the first service. The following uses an example to describe a specific implementation in which the identification information that is of the second data packet and that is recorded by the first network element is the first sequence information of the second data packet. It should be understood that the following descriptions are merely an example of an implementation in this case, and there may be another implementation. Details are not described.

Figure 6:
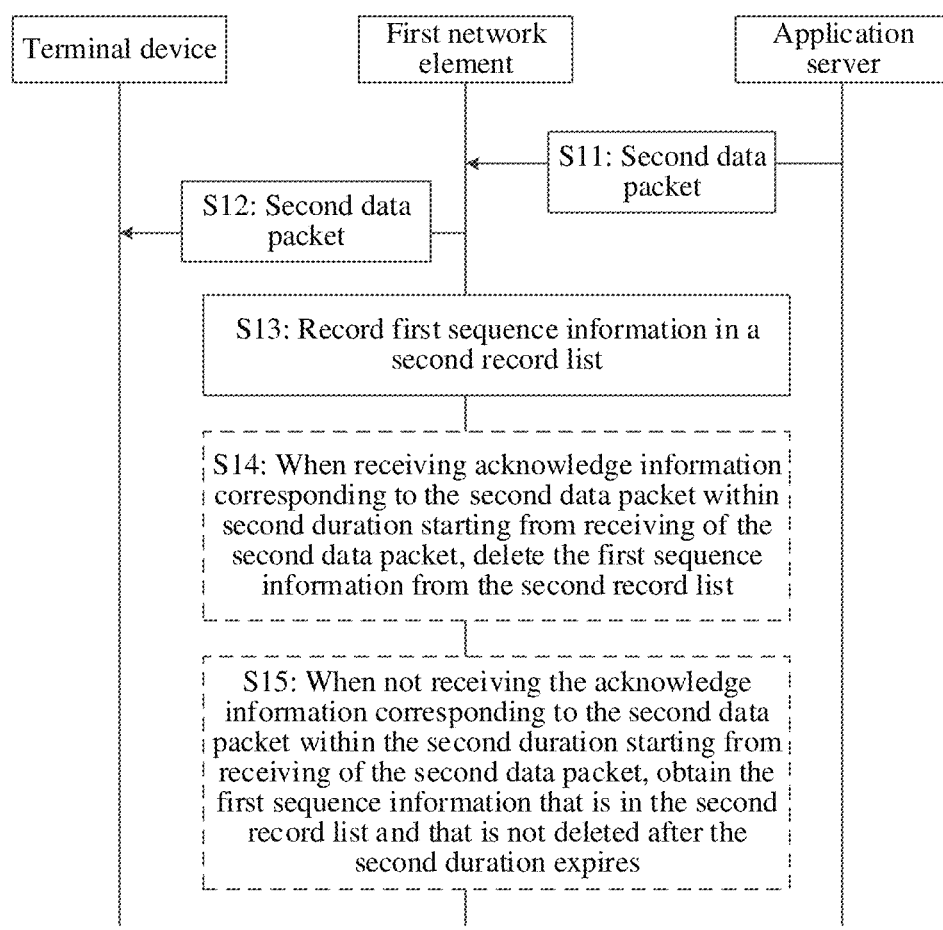
FIG. 6 is a schematic diagram of determining first sequence information according to an embodiment of this application.

In this specific implementation, step S401 may be implemented by performing step S15. Before step S15, the first network element may further perform some or all of steps S11 to S14. FIG. 6 is a schematic diagram of a manner of determining the first sequence information according to an embodiment of this application. As shown in FIG. 6, in this implementation:

S11: The first network element receives the second data packet.

S12: The first network element sends the second data packet to the terminal device.

S13: The first network element stores the first sequence information of the second data packet in a second record list. The second record list includes the sequence information of the data packet that is of the first service and that is received by the first network element.

S14: When receiving the acknowledge information corresponding to the second data packet within the second duration starting from receiving of the second data packet, the first network element deletes the first sequence information from the second record list.

S15: If the first network element does not receive the acknowledge information corresponding to the second data packet within the second duration starting from receiving of the second data packet, the first network element obtains the first sequence information that is in the second record list and that is not deleted after the second duration expires.

In the foregoing steps, the first network element obtains the first sequence information by maintaining information (including recording and deleting the information) in the second record list.

In a second alternative implementation, the first network element may receive the first sequence information from the second network element. Optionally, the second network element may be the terminal device, the application server of the first service, or the like. Further, optionally, a specific packet loss policy may be sent to the second network element in advance, or a specific packet loss policy is preconfigured in the second network element. Then, the second network element may determine the first sequence information based on the packet loss policy, and send the first sequence information to the first network element. It should be understood that the packet loss policy is intended to ensure real-time performance and continuity of the first service by moderately sacrificing service quality. The packet loss policy may indicate to perform packet loss for a data packet at a packet granularity, perform packet loss for a data packet at a frame granularity, perform packet loss for a data packet at a GOP granularity, or perform packet loss for a data packet at a file granularity, or the like. A specific policy in the packet loss policy is not limited herein.

The following provides descriptions based on a case in which the second network element is the terminal device or the application server.

When the second network element is the terminal device, in a first optional implementation, the terminal device may obtain the first sequence information of the second data packet that is not received within a third receiving time limit, and send the first sequence information to the first network element. In a second optional implementation, when an amount of buffered data of the first service is less than a first threshold, the terminal device obtains first sequence information of one or more second data packets that are sorted first in data packets that are not decoded for the first service, and sends the first sequence information to the first network element.

Further, in the first optional implementation, if the terminal device does not receive the second data packet within ninth duration starting from receiving of the previous data packet of the second data packet, the terminal device obtains the first sequence information of the second data packet, and sends the first sequence information to the second network element.

In the second optional implementation, the terminal device may obtain the first sequence information of the second data packet based on the amount of buffered data of the first service. The amount of data buffered by the terminal device for the first service may be an amount of data that has not been displayed, played, or presented and that is obtained after the terminal device performs processing such as decoding on a received data packet of the first service. For example, the first service is a media playback service for a media client 1, and the amount of data buffered by the terminal device for the first service is media data that has been decoded by the media client 1 but has not been played. Optionally, comparison between the amount of data buffered by the terminal device for the first service and the first threshold may be based on a data amount unit (unit such as bit, Kbit, or Mbit), or may be based on a service unit such as playback duration, a display page, or a quantity of displayed frames. A specific comparison manner is not limited herein.

The data packets of the first service may be classified into a data packet that has been decoded by the terminal device (where a media playback service is used as an example, including a data packet that has been decoded but has not been played and/or a data packet that has been decoded and played), and a data packet that has not been decoded by the terminal device (where the media playback service is used as an example, including a received data packet that has not been decoded and/or a data packet that has not been received). Generally, if the amount of data buffered by the terminal device for the first service is less than the first threshold, a cause may be that one or more data packets that are sorted first in data packets that are of the first service and that are not decoded cannot be successfully decoded by the terminal device due to a factor, where for example, the factor is that the data packets are not received. As a result, a subsequent data packet of the first service cannot be successfully decoded, and the amount of buffered data of the first service may be small. This may cause freezing. Therefore, the one or more data packets that are sorted first in the data packets that are of the first service and that are not decoded by the terminal device may be used as discarded data packets. The terminal device may obtain first sequence information of the one or more data packets that are sorted first in the data packets that are of the first service and that are not decoded by the terminal device, and send the first sequence information to the first network element.

It should be understood that, if the amount of data buffered by the terminal device for the first service is less than the first threshold, in a manner, the terminal device may obtain first sequence information of a data packet that is sorted first in the undecoded data packets of the first service, and send the first sequence information to the first network element. Further, the terminal device determines whether an amount of data for the first service is lower than the first threshold. If the amount of data is still lower than the first threshold, the terminal device may further obtain first sequence information of a data packet that is sorted first in data packets that are not decoded at this time, and send the first sequence information to the first network element. The foregoing loop may be performed until the terminal device completes receiving of the data packets of the first service. In another manner, the terminal device may obtain first sequence information of a plurality of data packets in undecoded data packets of the first service, and send the first network element. The plurality of data packets may be a preset quantity of data packets, or may be a plurality of data packets determined in another manner. For example, the plurality of data packets are determined based on an encoding/decoding relationship of the data packets. This is further described in detail below. There may be another implementation. This is not limited.

After determining the first sequence information, the terminal device may send the first sequence information based on a same message carrier of acknowledge information of a data packet that is sent most recently (which may be acknowledge information of a subsequent data packet). For example, the terminal device may send the first sequence information to the first network element by using an ACK message that is sent most recently. After extracting the first sequence information from the ACK message, the first network element continues to send the ACK message to the application server. Alternatively, the first sequence information may be sent to the first network element based on other uplink signaling of the terminal device. This is not limited herein.

When the second network element is the application server, if the application server does not receive the acknowledge information corresponding to the second data packet within a fourth receiving time limit, the application server may send the first sequence information of the second data packet to the first network element. The fourth receiving time limit may be tenth duration starting from sending of the second data packet to the terminal device by the application server.

After determining the first sequence information, the application server may send the first sequence information based on a data packet that is of the first service and that is sent most recently. After receiving the data packet, the first network element may continue to forward the data packet to the terminal device after extracting the first sequence information of the data packet. Alternatively, the first sequence information may be sent to the first network element based on other downlink signaling of the application server. This is not limited herein.

It should be understood that the first sequence information determined by the second network element may include only first sequence information of one second data packet, or may include first sequence information of a plurality of second data packets. When the first sequence information determined by the second network element includes the first sequence information of the plurality of second data packets, both the first sequence information determined by the second network element and the first sequence information sent by the second network element to the first network element may indicate the sequence of the second data packet, but forms of the first sequence information may be the same or different. For example, the first sequence information determined by the second network element includes the first sequence information of two second data packets (the data packet 1 and the data packet 2). For example, a TCP sequence number of the data packet 1 is 51, a data length is 100, a TCP sequence number of the data packet 2 is 151, and a data length is 50. In a manner, the first sequence information sent by the second network element to the first network element may include the TCP sequence number 51 and the data length 100, and may further include the sequence number 151 and the data length 50. In another manner, the first sequence information sent by the second network element to the first network element may include the TCP sequence number 51 and a data length 150.

After determining the first sequence information of the second data packet, the second network element sends the first sequence information to the first network element. Further, optionally, the second network element may further send first indication information to the first network element. The first indication information indicates that the second data packet is a to-be-discarded data packet.

Optionally, the second data packet may include a first target data packet, and the first sequence information determined in the foregoing manners of determining the first sequence information (including any foregoing manner in which the first network element determines the first sequence information, and/or any foregoing manner in which the second network element determines the first sequence information) may be understood as first sequence information of the first target data packet. In addition, the second data packet may further include a second target data packet determined based on second sequence information of the first target data packet and second indication information of the first target data packet. The second sequence information indicates a sequence of the first target data packet. The second indication information indicates a coding type corresponding to the first target data packet in the first service.

Further, optionally, the first target data packet is a part of the second data packet. The second sequence information of the first target data packet may indicate the sequence of the first target data packet. The second sequence information may be first sequence information of the part of the second data packet, or may be information in another form that may indicate a sequence of the part of the second data packet. For example, the second sequence information may be another variant form of the first sequence information of the part of the second data packet. In an example, the first sequence information may be a TCP sequence number, and the second sequence information may be a sequence number obtained after the TCP sequence number of the first sequence information is mapped to a GTP (GTP-U) layer. For another example, the second sequence information may include an SN (Serial Number) sequence number. The second sequence information may further include sequence information obtained by processing the first sequence information in another mapping manner, for example, another mapping manner extended at the GTP layer. This is not exhaustively described herein.

Further, optionally, the coding type corresponding to the first target data packet in the first service may indicate a coding/decoding relationship between the first target data packet and another data packet of the first service. For example, if the first service is a video service, video frames may include three media frame types: an I frame, a P frame, and a B frame. The I frame indicates a key frame, and includes complete data of one frame of picture. During decoding, only the data of this frame needs to be decoded. The P-frame indicates a differential frame, and includes differential data between the current frame and a previous I-frame or P-frame. During decoding, a previously buffered picture needs to be used as a reference frame for decoding, to generate a final picture. The B frame indicates a bidirectional differential frame, and includes differential data between the current frame and a previous frame and following frame. During decoding, a previously buffered picture and a subsequently buffered picture need to be used as a reference frame for decoding, to generate a final picture. Therefore, the data packet of the first service may carry a media frame type, indicating that the data packet is a data packet of the I frame, the P frame, or the B frame. The media frame type carried in the first target data packet is the second indication information. It should be understood that the second indication information may alternatively indicate another coding type. For example, the foregoing example is coding types of data packets of different video frames. The second indication information may alternatively indicate coding types of different data packets of a same video frame. The coding type is not limited herein.

A process in which the first network element obtains the first sequence information is used as an example. In an optional implementation, after the first network element determines the first target data packet, steps S16 and S17 may be further included. After step S17, the first network element obtains first sequence information of all determined second data packets (including the first target data packet and the second target data packet):

S16: The first network element obtains the second sequence information and second indication information that are of the first target data packet.

S17: The first network element determines the second target data packet in candidate data packets based on the second sequence information and the second indication information.

The candidate data packets may be one or more data packets other than the first target data packet in the undecoded data packets of the first service. The candidate data packets may include a data packet that has been received by the first network element but has not been sent to the terminal device, and may further include a data packet that has not been received by the first network element. In some embodiments, the first network element may obtain seventh indication information and eighth indication information that are of the candidate data packets. The seventh indication information indicates a sequence of the candidate data packets, and the eighth indication information indicates a coding type corresponding to the candidate data packets in the first service. Then, the first network element sorts the first target data packet and the candidate data packets based on the second sequence information of the first target data packet and the seventh indication information of the candidate data packets, and determines, based on the second indication information of the first target data packet and the seventh indication information of the candidate data packets, that a data packet that is in the candidate data packets and that cannot be normally decoded due to impact of the first target data packet is the second target data packet. Then, the first network element obtains the first sequence information of all the determined second data packets (including the first target data packet and the second target data packet determined in the candidate data packets).

For example, if the first service is a video playback service, the application server corresponding to the first service sequentially sends some data packets of the first service in the following sequence: a data packet 3 (whose media frame type is the P frame), a data packet 4 (whose media frame type is the I frame), a data packet 1 (whose media frame type is the P frame), a data packet 2 (whose media frame type is the P frame), a data packet 5 (whose media frame type is the I frame), and a data packet 6 (whose media frame type is the B frame). At a moment after the application server sends the data packets, the first network element has received the data packet 1 and the data packet 2 but has not sent the data packets to the terminal device, and the first network element has not received the data packet 3, the data packet 4, the data packet 5, and the data packet 6. The data packet 3 and the data packet 4 have exceeded respective corresponding data packet receiving time limits, and the data packet 5 and the data packet 6 have not exceeded respective corresponding data packet receiving time limits. The first network element may determine the data packet 3 and the data packet 4 as first target data packets. A result of sorting the data packets 1 to 6 based on information that is of the data packet 1 to the data packet 6 and that indicates a sequence of the data packets may be reflected by using Table 1. Table 1 sequentially displays the data packets in a sequence from left to right and media frame types corresponding to the data packets.

TABLE 1

| Data packet 3 | Data packet 4 | Data packet 1 | Data packet 2 | Data packet 5 | Data packet 6 |
| --- | --- | --- | --- | --- | --- |
| P frame | I frame | P frame | P frame | I frame | B frame |

Because the data packet 3 and the data packet 4 are the discarded first target data packets, the first network element does not subsequently send the two data packets to the terminal device. Because the discarded data packet 4 is an I-frame data packet, and the data packet 1 and the data packet 2 are P-frame data packets, the terminal device needs to use the data packet 4 to decode the data packet 1 and the data packet 2. Therefore, the data packet 1 and the data packet 2 cannot be normally decoded because the data packet 4 is discarded. Therefore, the first network element may further determine the data packet 1 and the data packet 2 as second target data packets. For example, the first network element may delete the received data packet 1 and data packet 2 from a data packet sending queue. The data packet 5 is an I-frame data packet, and the data packet 5 and the data packet 4 are data packets corresponding to different frames (where it should be understood that although the data packet 4 and the data packet 5 have a same frame type: I frame, the data packet 4 and the data packet 5 are data packets corresponding to different picture frames). Therefore, data packet 5 is not affected by the discarded data packet 4. The data packet 6 is a B-frame data packet, is not affected by the discarded data packet 3, data packet 4, data packet 1, or data packet 2, and is not a data packet corresponding to a same frame as any data packet of the data packet 3, the data packet 4, the data packet 1, or the data packet 2. Therefore, the first network element may continue to wait for the data packet 5 and the data packet 6 when the data packet receiving time limits corresponding to the data packet 5 and the data packet 6 do not expire.

It should be noted that when the first network element has received the first target data packet or the candidate data packets, the second sequence information and second indication information of the first target data packet may be obtained by the first network element from the first target data packet. The seventh indication information and eighth indication information of the candidate data packets may be obtained from the candidate data packets. When the first network element has not received the first target data packet or the candidate data packets, the second sequence information or second indication information of the first target data packet and the seventh indication information or eighth indication information of the candidate data packets may be determined based on related information of a data packet that has been received by the first network element. For example, the related information may be a sampling time point.

For the latter case described above, an example is used. The first service is a video playback service, a video played by the first service has specific playback duration, and the data packets are obtained by sampling data of different playback duration. The data packet of the first service may carry a sampling time point of the data packet (a time point for sampling based on the playback duration), and the data packet of the first service is a TCP packet. For this video, one video frame of I-frame type may be packaged at intervals of specific sampling duration, and a data packet between adjacent data packets of I-frame type is a P-frame type or a B-frame type. For example, one video frame of I-frame type may be packaged every 1 s. In other words, data packets obtained through sampling at a start of an integral second of the video are all of I-frame type, and data packets obtained at other sampling time points are of B-frame type or P-frame type. For example, when FPS (frames per second, quantity of frames transmitted per second)=5, a corresponding sequence may be the I-frame type, P-frame type, B-frame type, P-frame type, and P-frame type. It is assumed that the application server corresponding to the first service sequentially sends some data packets of the first service in the following sequence: a data packet 7, a data packet 8, a data packet 9, the data packet 1, and the data packet 2. At a moment after the data packets are sent, the first network element sequentially receives the data packet 7, the data packet 8, the data packet 1, and the data packet 2, and sampling time points, media frame types, TCP sequence numbers, and data lengths that are corresponding to the data packets are shown in Table 2:

TABLE 2

| Data packet label | 7 | 8 | 1 | 2 |
|---|---|---|---|---|
| Sampling time point | 0.2 s | 0.4 s | 0.8 s | 1 s |
| Media frame type | P frame | P frame | P frame | B frame |
| TCP Sequence Number | 1 | 51 | 201 | 251 |
| Data length | 50 | 70 | 50 | 50 |

The first network element may determine, based on the TCP sequence numbers and data lengths of the data packet 8 and the data packet 1, that a data packet sorted between the data packet 8 and the data packet 1 has not arrived. If the unreceived data packet exceeds a corresponding data packet receiving time limit, the data packet may be determined as the first target data packet. The first network element may learn, based on the sampling time points of the data packet 8 and data packet 1, that the data packet sorted between the data packet 8 and the data packet 1 includes a data packet (namely, the data packet 9) whose sampling starts at 0.6 s, and a media frame type of the data packet is the I frame. The data packet 7, the data packet 8, the data packet 1, and the data packet 2 may be used as candidate data packets. Because the data packet 7 and the data packet 8 are P frames, and are not data packets of a same frame as the data packet 9, the terminal device may receive and normally decode the data packet 7 and the data packet 8. The data packet 7 and the data packet 8 are not the first target data packets. The data packet (the data packet 9) whose sampling starts at 0.6 s is determined as the discarded first target data packet. Therefore, although the data packet 1, the data packet 2, and the data packet 9 are data packets of different frames, the data packet 9 is one data packet of I-frame. The data packet 1 and the data packet 2 cannot be normally decoded by the terminal due to impact of the discarded data packet 9. Therefore, the data packet 1 and the data packet 2 are further determined as the second target data packets that cannot be decoded due to the impact of the discarded data packet.

The foregoing describes the implementation in which the first network element further determines, in the process in which the first network element obtains the first sequence information and based on the first target data packet, the second target data packet that cannot be normally decoded due to discarding of the first target data packet. Similarly, in the process in which the second network element determines the first sequence information, alternatively, the second network element may first determine the first target data packet, then determine, based on the first target data packet, the second target data packet that cannot be normally decoded due to discarding of the first target data packet, and send the first sequence information of all the determined second data packets to the first network element. For the implementation in which the second network element determines the second target data packet based on the first target data packet, refer to the implementation in which the first network element determines the second target data packet based on the first target data packet in the process in which the first network element automatically obtains the first sequence information. Details are not described herein again.

It should be noted that the second data packet discarded for the first service in S401 is a data packet on which a discarding action is to be performed by (the first network element or the second network element), and may be the same as or different from a data packet on which a discarding action has been performed. For example, optionally, before step S401, the method may further include some or all steps in steps S404 to S406.

S404: The first network element receives the second data packet.

S405: The first network element checks the second data packet.

When the check succeeds, the first network element sends the second data packet to the terminal device. When the check fails, the first network element performs S406.

The second data packet may include a second checksum. When checking the second data packet, the first network element may check a second checksum carried in the second data packet.

S406: The first network element discards the second data packet.

If the first sequence information is determined by the first network element based on whether the second data packet is received within the first receiving time limit. After the first network element discards the second data packet in S406, it is assumed that the first network element receives, within the first receiving time limit, the second data packet transmitted by the application server again. In this case, the second data packet is sent to the terminal device. In this case, the second data packet is not a data packet discarded for the first service. If the first network element does not receive, within the first receiving time limit, the second data packet transmitted by the application server again, the second data packet is a data packet discarded for the first service.

S402: The first network element determines a third data packet.

The third data packet includes the first sequence information. Optionally, the first sequence information may be included in header information of the third data packet. Further, optionally, the first sequence information may be included in the foregoing first information. In addition to the first sequence information, the third data packet may include other information in the first information, for example, a part or all of information such as the source IP address, the source port number, the target IP address, the target port number, and the transmission protocol.

Optionally, the third data packet may be a data packet reconstructed by the first network element for the second data packet, and an amount of data in the third data packet is less than an amount of data in the second data packet. For example, the third data packet may be a null data packet, such as a data packet whose length of payload data is zero. For another example, the third data packet may be a data packet including 1-bit data, and the 1-bit data may be data randomly written by the first network element, or may be pre-specified data. For example, the pre-specified data may be indication data indicating that the third data packet is a data packet reconstructed by the first network element. Because the amount of data in the third data packet is less than the amount of data in the second data packet, transmission pressure of transmitting the third data packet in a network is less than transmission pressure of transmitting the second data packet. Therefore, a success rate of transmitting the third data packet is far higher than a success rate of transmitting the second data packet. That is, a success rate of receiving a data packet carrying the first sequence information by the terminal device is improved, and a probability of freezing of the service of the terminal device is reduced.

Optionally, the third data packet may further include a first checksum, and the first checksum may be used to check reliability of the third data packet. After receiving the third data packet, the terminal device may check the third data packet based on the first checksum. Therefore, a process in which the first network element determines the third data packet may further include determining of the first checksum by the first network element. For example, when the second data packet is a TCP packet, the third data packet determined for the second data packet is also a TCP packet. The first checksum may be determined by the first network element based on a TCP header, TCP data, and other data packet header information (such as the source IP address and the destination IP address) of the third data packet. The TCP header of the third data packet may include a source port, a destination port, a TCP sequence number, a reserved byte, and the like. The TCP data of the third data packet is determined by the first network element, for example, may be null, may be several random bits of data, or may be specified data.

Optionally, the first sequence information determined by the first network element in step S401 may include only first sequence information of one second data packet, or may include first sequence information of a plurality of second data packets. When only the first sequence information of one second data packet is included, the first network element may determine one third data packet for the second data packet based on the first sequence information of the second data packet. When the first sequence information of the plurality of second data packets is included, in an implementation, the first network element may determine, based on the first sequence information of each second data packet, a third data packet for the corresponding second data packet. In another implementation, the first network element may determine one third data packet for the plurality of second data packets based on the first sequence information of the plurality of second data packets.

In addition, it should be noted that both the first sequence information obtained by the first network element in step S401 and the first sequence information included in the third data packet determined by the first network element in step S402 may indicate the sequence of the second data packet. However, forms of the first sequence information may be the same or may be different.

An example in which the first network element determines the third data packet and the form of the first sequence information is used below to describe different cases.

In a first implementation, the first sequence information determined by the first network element in S401 is first sequence information for one second data packet. In S402, the first network element determines one third data packet for the second data packet. In addition, a form of the first sequence information determined by the first network element is the same as a form of the first sequence information included in the third data packet. For example, in S401, the first network element determines that the discarded second data packet includes only one data packet 1. The data packet 1 is a TCP packet, and the first sequence information of the data packet 1 includes a TCP sequence number 51 and a data length 70. In this case, in S402, the first network element may determine one third data packet for the data packet 1. The third data packet may carry the TCP sequence number 51 and the data length 70.

In a second implementation, the first sequence information determined by the first network element in S401 includes respective first sequence information of a plurality of second data packets. In S402, the first network element determines a third data packet for each second data packet based on the first sequence information of the second data packet. In addition, a form of the first sequence information determined by the first network element is the same as a form of the first sequence information included in the third data packet. For example, in S401, the first network element determines that the discarded second data packet includes a data packet 2 and a data packet 3. Both the data packet 2 and the data packet 3 are TCP packets. The first sequence information of the data packet 2 includes a TCP sequence number 101 and a data length 50. The first sequence information of the data packet 3 includes a TCP sequence number 151 and a data length 100. In S402, the first network element may determine one third data packet for the data packet 2. The third data packet may carry the TCP sequence number 101 and the data length 50. The first network element may further determine one third data packet for the data packet 3. The third data packet may carry the TCP sequence number 151 and the data length 100.

In a third implementation, the first sequence information determined by the first network element in S401 includes respective first sequence information of a plurality of second data packets. In S402, the first network element determines one third data packet for the plurality of second data packets based on the first sequence information of the second data packets. In addition, a form of the first sequence information determined by the first network element is different from a form of the first sequence information included in the third data packet. For example, in S401, the first network element determines that the discarded second data packet includes a data packet 4 and a data packet 5. Both the data packet 4 and the data packet 5 are TCP packets. The first sequence information of the data packet 4 includes a TCP sequence number 251 and a data length 60. The first sequence information of the data packet 5 includes a TCP sequence number 311 and a data length 70. In S402, the first network element may determine one third data packet for the data packet 4 and the data packet 5. The third data packet may carry the TCP sequence number 251 and the data length 130.

S403: The first network element sends the third data packet to the terminal device.

The first network element sends the third data packet to the terminal device. The third data packet includes the first sequence information of the second data packet. The terminal determines, based on the checksum, that the second data packet has been successfully received, so that the terminal device may be triggered to perform processing such as decoding on a following data packet of the second data packet. For example, when the data packet of the first service is a TCP packet, if the terminal device delivers all previous data packets of the second data packet from a transmission control layer to an application layer for processing, the first network element may deliver the third data packet from the transmission control layer to the application layer. Further, adjacent data packets following the second data packet may be sequentially delivered from the transmission control layer to the application layer, and processing such as decoding is performed. This resolves a problem of freezing caused because processing such as decompression cannot be performed on the data packets following the second data packet due to discarding of the second data packet.

Optionally, after the terminal device receives the third data packet, the terminal device may send fourth indication information to the application server. The fourth indication information indicates that the third data packet that carries the first information and that is received by the terminal device is a data packet constructed by the first network element for the to-be-discarded second data packet. Therefore, when the application server performs traffic transmission control for the terminal device, misjudgment of a network condition of the terminal device is avoided (where it is mistakenly considered that the terminal device has a good network and can successfully receive the second data packet, but the second data packet has been discarded in fact). This increases a data packet transmission rate of the terminal device. Consequently, more transmission pressure is brought to the network of the terminal device, causing a loss of more data packets. Further, optionally, in a manner, the terminal device may send the fourth indication information when triggered by the third data packet. For example, the third data packet may carry fifth indication information. The fifth indication information may indicate the terminal device to send the fourth indication information.

Optionally, after step S403, the first network element may further send sixth indication information to the terminal device. The sixth indication information may indicate that the third data packet is a data packet that is constructed by the first network element and that carries the first sequence information. Therefore, when the terminal device performs traffic transmission control, misjudgment of a network condition of the terminal device is avoided (where it is mistakenly considered that the network is good, and the second data packet can be successfully received, but the second data packet has been discarded in fact). This increases a data packet transmission rate. Consequently, more transmission pressure is brought to the network, causing a loss of more data packets. Further, optionally, the sixth indication information may be carried in the third data packet, or may be carried in another data packet. This is not limited herein. For example, after obtaining the sixth indication information from the third data packet, a network layer of the terminal device may notify a TCP layer that the third data packet is a data packet constructed by the first network element. Then, the TCP layer may perform traffic control based on the information, to avoid more network congestion caused by misjudgment of the network condition.

Optionally, after step S403, the method may further include step S407 and step S408.

S407: The first network element receives the second data packet.

S408: The first network element discards the second data packet.

After the first network element sends the third data packet carrying the first sequence information to the terminal device, if the second data packet carrying the first sequence information is received, because the terminal device no longer needs the second data packet in this case, the first network element may discard the second data packet, to avoid a waste of transmission resources caused by transmission of the second data packet.

Optionally, after step S403, the method may further include step S409 or step S410:

S409: When receiving first acknowledge information from the terminal device, the first network element deletes the first sequence information from a first record list.

S410: The first network element deletes the first sequence information from a first record list after first duration starting from sending of the third data packet to the terminal device.

The first acknowledge information indicates that the terminal device has received the data packet carrying the first sequence information. The first record list in S409 or S410 includes the sequence information of the data packet to be discarded by the first network element for the first service. Further, optionally, after determining the first sequence information, the first network element may store the first sequence information in the first record list, and perform step S409 or S410 when a condition is met.

The first network element may delete, by performing step S409, the information corresponding to the data packet received by the terminal device, and the first network element may further perform other processing on information about a data packet that is not deleted in the first record list, for example, periodically reconstructing a data packet for the undeleted information and sending the data packet to the terminal device. Alternatively, the first network element deletes, by performing step S410, the first sequence information from the first record list after the first duration, so that a mistaken packet loss case caused by a cycle of the first sequence information can be prevented. That is, for a data packet of the first service, the first sequence information may be used cyclically. The first network element may subsequently receive a data packet that is of the first service and that carries the first sequence information but has different data. By periodically deleting information in the first record list, a case in which the first network element mistakenly considers the data packet as the second data packet and discards the data packet can be avoided as far as possible. This improves data packet transmission reliability of the first service.

It should be understood that, in an optional manner, the first record list may be obtained by maintaining the foregoing second record list by the first network element (the second record list in steps such as S13). For example, each time the first network element receives a data packet of the first service, the first network element adds sequence information of the data packet to the second record list. If acknowledge information of the data packet is received within second duration starting from receiving of the data packet, the sequence information of the data packet may be deleted from the second record list, and sequence information of data packets that are not deleted after the second duration expires constitutes the sequence information in the first record list (that is, the sequence information of the data packets to be discarded by the first network element for the first service).

In this embodiment of this application, the first network element may re-determine, for the discarded second data packet of the first service, the third data packet carrying the first sequence information. Because the third data packet carries the first sequence information, after the terminal device receives the third data packet, and when a previous data packet of the second data packet has been decoded, the terminal device may decode the third data packet, and may further decode a following data packet of the third data packet. This avoids freezing of the first service because a following data packet of the second data packet cannot be decoded due to waiting for the second data packet, and improves continuity and real-time performance of the first service.

Figure 7:
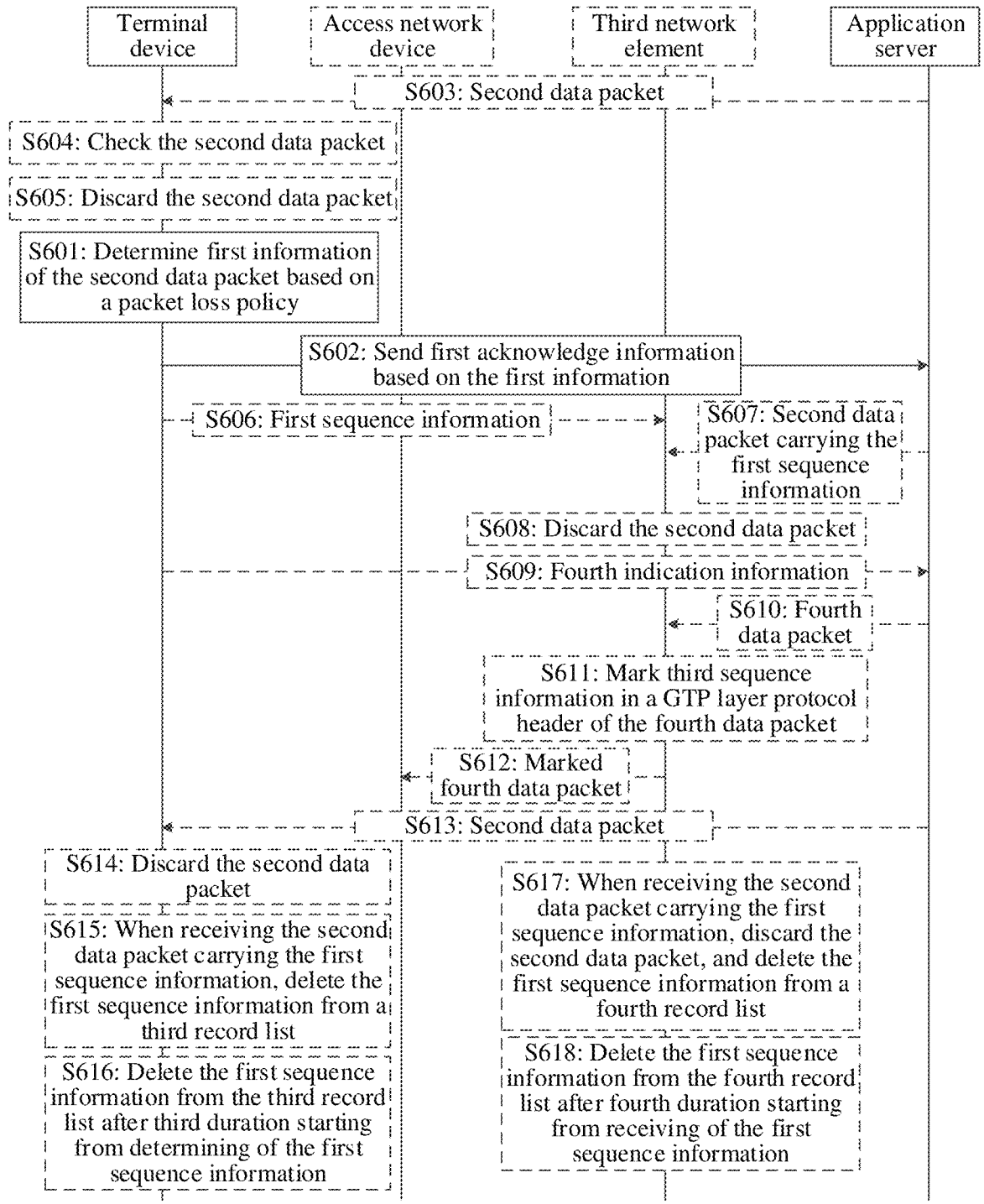
FIG. 7 shows another data packet transmission method according to an embodiment of this application.

Refer to FIG. 7. An embodiment of this application further provides another data packet transmission method. In an implementation, the data packet transmission method corresponding to FIG. 7 may be implemented based on the data packet transmission system corresponding to FIG. 3b. The method relates to interaction between a terminal device and an application server. Optionally, interaction between the terminal device and application server and a third network element is further related. The terminal device may be the terminal device shown in FIG. 3b. The application server may be the application server shown in FIG. 3b. The third network element may be the third network element shown in FIG. 3b, or may be an (R)AN device and/or a core network element (for example, a UPF network element) connected to the terminal device. For related descriptions, refer to the related descriptions in FIG. 3b. As shown in FIG. 7, the data packet transmission method may include at least steps S601 and S602 that are sequentially performed.

S601: The terminal device determines first sequence information of a second data packet based on a packet loss policy.

The second data packet is a to-be-discarded data packet of a first service, the first sequence information is sequence information of the second data packet, and the first sequence information indicates a sequence of the second data packet.

Optionally, the first sequence information may be included in first information. The first information may further include other information. For details, refer to the related descriptions of the first information in the embodiment corresponding to FIG. 4. Details are not described herein again.

The second data packet is the to-be-discarded data packet of the first service. The discarded data packet may indicate that data packet processing related to the first service is no longer performed on the data packet. For discarding of the data packet, refer to the related descriptions of discarding of the data packet in the embodiment corresponding to FIG. 4. Details are not described herein again.

It should be understood that the second data packet determined in S601 is a data packet on which a discarding action is to be performed by the terminal device, and may be different from a data packet on which discarding has been performed. For example, optionally, before step S601, the method may further include some or all steps in steps S603 to S607.

S603: The terminal device receives the second data packet.

S604: The terminal device checks the second data packet.

When the check succeeds in S603, the terminal device performs processing such as decoding on the second data packet. When the check in S603 fails, the terminal device performs S605.

The second data packet may include a second checksum. When checking the second data packet, the terminal device may check the second checksum carried in the second data packet.

S605: The terminal device discards the second data packet.

After the terminal device discards the second data packet in S605, if the terminal device receives, within a third receiving time limit, the second data packet retransmitted by the application server, and successfully checks the retransmitted second data packet, the second data packet is not a data packet discarded for the first service. If the terminal device does not receive, within the third receiving time limit, the second data packet retransmitted by the application server, the second data packet is a data packet discarded for the first service.

In a process in which the terminal device obtains the first sequence information of the second data packet, the first sequence information may be determined based on the packet loss policy. The packet loss policy may be transmitted to the terminal device in advance, or may be configured in the terminal device in advance. It should be understood that the packet loss policy is intended to ensure real-time performance and continuity of the first service by moderately sacrificing service quality. The packet loss policy may indicate to perform packet loss for a data packet at a packet granularity, perform packet loss for a data packet at a frame granularity, perform packet loss for a data packet at a GOP granularity, or perform packet loss for a data packet at a file granularity, or the like. A specific policy in the packet loss policy is not limited herein.

In a first optional implementation in which the terminal device determines the first sequence information based on the packet loss policy, the terminal device may obtain the first sequence information of the second data packet that is not received within the third receiving time limit. In a second optional implementation in which the terminal device determines the first sequence information based on the packet loss policy, when an amount of buffered data of the first service is less than a first threshold, the terminal device obtains first sequence information of one or more second data packets that are sorted first in data packets that are of the first service and that are not decoded.

Further, the second data packet may include a first target data packet. The first sequence information determined in the first optional implementation or the second optional implementation may be understood as first sequence information of the first target data packet. In addition, the second data packet may further include a second target data packet determined based on second sequence information of the first target data packet and second indication information of the first target data packet. The second sequence information indicates a sequence of the first target data packet, and the second indication information indicates a coding type corresponding to the first target data packet in the first service.

The first optional implementation or the second optional implementation of determining the first sequence information, and the implementation of determining the second target data packet based on the second sequence information and second indication information of the first target data packet are described in detail in S401 in the embodiment corresponding to FIG. 4. For details, refer to the corresponding descriptions. Details are not described herein again.

S602: The terminal device sends first acknowledge information to the application server based on the first sequence information.

In a process of receiving a data packet of the first service, the terminal device may reply with acknowledge information to the received data packet. In an implementation, the terminal device may separately reply with acknowledge information to each received data packet. In another implementation, the terminal device may reply with acknowledge information to data packets received within a specific time window. Therefore, the first acknowledge information returned by the terminal device may be acknowledge information corresponding to the second data packet, or may be acknowledge information corresponding to the second data packet and another data packet received by the terminal device within the specific time window.

For example, when the data packet of the first service is a TCP packet, if the first sequence information includes a TCP sequence number 101 of the second data packet and a length 100 of the second data packet, the first acknowledge information sent by the terminal device to the application server may include an acknowledge character 200. For another example, if the terminal device replies with the acknowledge information for the data packets received within the specific time window, the terminal device receives a fourth data packet and a fifth data packet within a current time window. A TCP sequence number of the fourth data packet is 31, and a data length is 70. A TCP sequence number of the fifth data packet is 201, and a data length is 50. The terminal device may reply with a common first acknowledge information to the second data packet, the fourth data packet, and the fifth data packet. The first acknowledge information may include an acknowledge character 250.

After receiving the first acknowledge information, the application server transmits, to the terminal server, a following data packet that is the second data packet and that is of the first service, to avoid freezing and a waste of transmission resources that may be caused by repeated retransmission of the second data packet and repeated packet losses.

Optionally, after step S602, the method may further include some or all steps in steps S606 to S608.

S606: The terminal device sends the first sequence information to the third network element.

The first sequence information is used to trigger the third network element to discard the second data packet when receiving the second data packet carrying the first sequence information from the application server. Optionally, the terminal device may further send first indication information to the third network element. The first indication information indicates that the second data packet is a discarded data packet.

S607: The third network element receives the second data packet carrying the first sequence information from the application server.

S608: The third network element discards the second data packet.

After the terminal device sends the first acknowledge information to the third network element, it indicates that the terminal device no longer needs the second data packet. Therefore, the third network element discards the second data packet received after receiving the first sequence information sent by the terminal device, to avoid repeated transmission of the second data packet that is not needed by the terminal device. This saves data packet transmission resources.

If the third network element receives the second data packet after step S606 (that is, S607 is performed), S608 is performed. If the second data packet is not received after step S606 (that is, S607 is not performed), step 608 is not performed.

Optionally, the method may further include step S609:

S609: The terminal device sends fourth indication information to the application server.

It should be understood that the first sequence information in step S603 and the fourth indication information in step S609 may be sent by using same signaling, or may be sent by using different signaling.

The fourth indication information indicates that the first acknowledge information is sent when the terminal device does not receive the second data packet carrying the first sequence information. Therefore, when the application server performs traffic transmission control for the terminal device, misjudgment of a network condition of the terminal device is avoided (where it is mistakenly considered that the terminal device has a good network and can successfully receive the second data packet, but the second data packet has been discarded in fact). This increases a data packet transmission rate of the terminal device. Consequently, more transmission pressure is brought to the network of the terminal device, and causing a loss of more data packets.

Optionally, when the third network element includes the core network element, before the third network element receives the first sequence information from the terminal device, steps S610 to S612 may be further included.

S610: The third network element receives a fourth data packet.

S611: The third network element marks third sequence information in a GTP (GPRS tunneling protocol) layer protocol header of the fourth data packet.

S612: The third network element sends a marked fourth data packet to an access network device.

The fourth data packet is any data packet of the first service, and the third sequence information of the fourth data packet includes information indicating a sequence of the fourth data packet. It should be understood that the fourth data packet may include the second data packet, and the third sequence information of the fourth data packet is the first sequence information of the second data packet.

If the third sequence information is information included in a TCP layer protocol header, because the third network element is the core network element such as the UPF network element, the third network element may obtain the third sequence information in the TCP layer protocol header, but the access network device cannot obtain the information included in the TCP layer protocol header. Therefore, before transmitting the fourth data packet to the access network device, the third network element may obtain the third sequence information in the TCP layer protocol header of the fourth data packet, and mark the third sequence information at a GTP layer of the fourth data packet. Then, after receiving the fourth data packet, the access network device may obtain the third sequence information of the fourth data packet from the GTP layer of the fourth data packet, to determine whether the fourth data packet is a discarded data packet.

Optionally, when the third network element includes the access network device, that the third network element discards the second data packet in step S605 may include: The third network element obtains sequence information marked in a GTP layer protocol header of the second data packet, and discards the second data packet when the sequence information marked in the GTP layer protocol header matches the first sequence information.

The sequence information marked in the GTP protocol header of the second data packet received by the access network device may be marked by the core network element such as the UPF network element. Then, the access network device may obtain the sequence information marked in the GTP layer protocol header of the second data packet, compares the sequence information with the first sequence information sent by the third network element, and discards the second data packet when the sequence information matches the first sequence information. Herein, a case in which it is determined that the sequence information matches the first sequence information may be that the sequence information is completely the same as the first sequence information, or information about a specified field in the sequence information marked in the GTP layer protocol header of the second data packet is the same as information about a specified field in the first sequence information sent by the third network element, or the like. This is not limited.

Optionally, after S602, the method may further include steps S613 and S614.

S613: The terminal device receives the second data packet carrying the first sequence information.

S614: The terminal device discards the second data packet.

If the terminal device receives the second data packet after S602 (that is, S613 is performed), S614 is performed. If the second data packet is not received after S602 (that is, S613 is not performed), S614 is not performed. In step S614, the terminal device may discard the second data packet based on the first sequence information determined in S601.

Optionally, after S602, the method may further include step S615 or S616:

S615: When receiving the second data packet carrying the first sequence information, the terminal device discards the second data packet, and deletes the first sequence information from a third record list.

S616: The terminal device deletes the first sequence information from a third record list after third duration starting from determining of the first sequence information.

The third record list in step S615 or S616 includes sequence information of a data packet to be discarded by the terminal device for the first service. Further, optionally, after determining the first sequence information in S601, the terminal device stores the first sequence information in the third record list, and performs step S615 or S616 when a condition is met. The first sequence information stored in the third record list is used in S614 to delete the second data packet based on the first sequence information.

By performing step S615, after receiving the data packet that has been determined to be discarded, the terminal device may discard the second data packet, and delete information about the data packet from the third record list. The terminal device may further perform other processing on information about an undeleted data packet in the third record list. Alternatively, by performing step S616, the terminal device may delete the first sequence information from the third record list after the third duration. This can avoid a mistaken loss of the data packet of the first service caused by cyclic use of the first sequence information, and improve data packet transmission reliability of the first service.

Optionally, after step S601, the method may further include step S617 or S618.

S617: When receiving the second data packet carrying the first sequence information, the third network element deletes the first sequence information from a fourth record list.

If the second data packet is received in S617, the second data packet is discarded, and the first sequence information in the fourth record list is deleted.

S618: The third network element deletes the first sequence information from a fourth record list after fourth duration starting from receiving of the first sequence information.

The fourth record list in S617 or S618 includes sequence information of a data packet to be discarded by the terminal device for the first service. Further, optionally, after receiving the first sequence information from the terminal device, the third network element stores the first sequence information in the fourth record list, and performs step S617 or S618 when a condition is met.

By performing step S617, after receiving the data packet that is determined as a discarded data packet, the third network element may discard the second data packet, and delete information about the data packet from the fourth record list. The third network element may further perform other processing on information about an undeleted data packet in the fourth record list, for example, periodically feed back undeleted information to the first network element. Alternatively, by performing step S618, the first network element may delete the first sequence information from the fourth record list after the fourth duration. This can avoid a mistaken loss of the data packet of the first service caused by cyclic use of the first sequence information, and improve data packet transmission reliability of the first service.

Optionally, after step S602, a network layer of the terminal device may notify a TCP layer that the first acknowledge information is sent when the second data packet is not received. Then, the TCP layer may perform flow control based on the information, to avoid more network congestion caused by misjudgment of the network condition.

In this embodiment of this application, the terminal device may determine the first sequence information of the second data packet based on the packet loss policy, and send the first acknowledge information to the application server based on the first sequence information. Then, the terminal device decodes a data packet sorted after the second data packet, toy reduce freezing of the first service. This ensures continuity and real-time performance of the first service.

Figure 8:
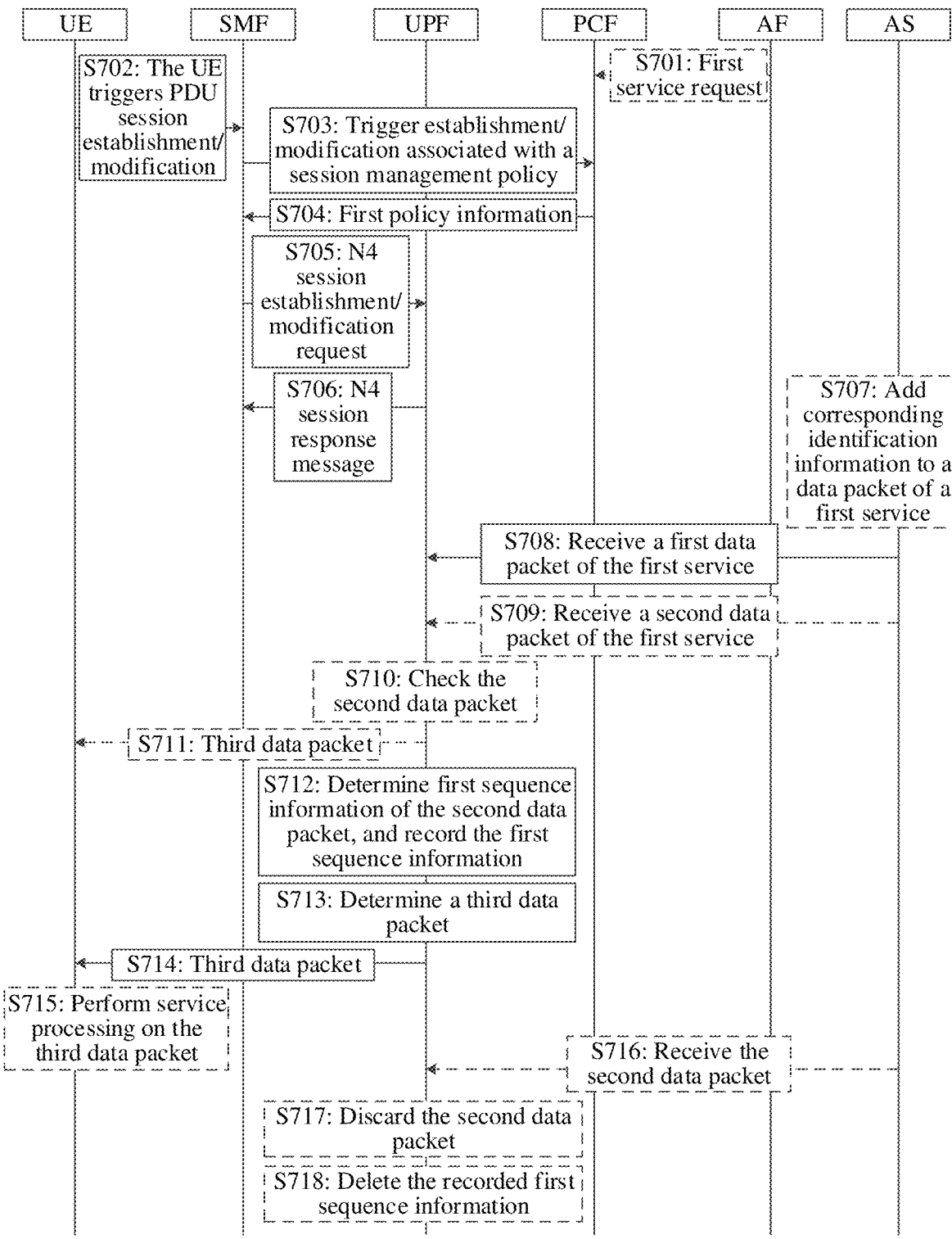
FIG. 8 is a schematic flowchart of still another data packet transmission method according to an embodiment of this application.

FIG. 8 is a schematic flowchart of another data packet transmission method according to an embodiment of this application. The data packet transmission method shown in FIG. 8 may be applied to PDU session establishment/modification scenarios triggered by UE. The scenarios include a scenario in which a new PDU session is established, a scenario in which when an N26 interface (where the N26 interface is an interface between an AMF network element and an MME network element (mobility management network element in a 4G system)) is not deployed, a PDN (public data network) connection in an EPS (evolved packet system) is switched to a PDU session in a 5GS (system architecture for a 5G system), a scenario in which an existing PDU session is switched between non-3GPP access and 3GPP access, and the like. As shown in FIG. 8, the method may include some or all steps in steps S701 to S717. It should be noted that objects with same names in the embodiment corresponding to FIG. 4 or FIG. 7 may be objects that have different indication functions and that are different from first indication information, second indication information, and third indication information in the embodiment corresponding to FIG. 8.

S701: An AF network element sends a first service request to a PCF network element.

Step S701 is an optional step. The first service request may include one or more of the following information: a tolerable service delay corresponding to a first service, the first indication information, or flow description information.

The tolerable service delay corresponding to the first service may be a tolerable delay specified for a data packet of the first service. For example, a tolerable service time limit may indicate a maximum receiving time limit of the data packet of the first service, or indicate a maximum receiving time limit of acknowledge information corresponding to the data packet of the first service. The tolerable service delay may be used to determine first sequence information of a second data packet. In some embodiments, the tolerable service delay may be an end-to-end delay threshold or a partial delay between a user and an application server, and depends on a deployment location of a network element that determines the second data packet based on the information.

The first indication information may indicate the PCF network element to perform, for the first service, a corresponding action (where for example, after S703, the PCF network element performs S704) in the data packet transmission method in this embodiment of this application.

The flow description information may include related information indicating a service flow of the first service, for example, include 3-tuple information (including a transport protocol type, a destination IP address, and a destination port) of the service flow of the first service; for another example, include 5-tuple information (including a source IP address, a source port, a destination IP address, a destination port, and a transmission protocol type) of the service flow of the first service; or may include a service type (for example, a video service, an audio service, a game service, or a web service) corresponding to the first service, an access network identifier, and the like.

Optionally, the first service request may further include media identifier type information. The media identifier type information may include one or more types of identifier information, and indicates identifier information that may be carried in the data packet that is of the first service and that is sent by the AS device. Each piece of identification information may indicate a type of a data packet, and may further indicate a function corresponding to the data packet in a data packet encoding/decoding process of the first service.

Optionally, when the AF network element is in an external data network domain, the AF network element needs to send corresponding information to the PCF network element via a NEF network element. In some embodiments, the AF network element sends the corresponding information to a UDR network element, so that a change of information in the UDR network element is triggered to notify the PCF network element.

In this method, when optional step S701 is not performed, one or more types of information included in the first service request may be preconfigured for the PCF network element through preconfiguration, or may be transmitted to the PCF network element via another network element or device. This is not limited herein.

S702: The UE triggers establishment/modification of a PDU session to an SMF network element.

It should be understood that the UE may trigger, via a (R)AN device or an AMF network element, the SMF network element to establish/modify the PDU session. In some embodiments, the SMF network element may be triggered to establish/modify the PDU session by performing the following steps.

(1) The UE may send a PDU session establishment/modification request to the AMF network element via the (R)AN device.

(2) The AMF network element selects the SMF network element for the UE.

In some embodiments, the PDU session establishment request sent by the UE may include a type of the PDU session that the UE requests to establish. The AMF network element may select the SMF network element for the UE based on the type of the PDU session that the UE requests to establish.

(3) The AMF network element sends an N4 context creation/modification request to the SMF network element selected for the UE.

S703: The SMF network element triggers establishment/modification associated with a session management policy to the PCF network element.

S704: The PCF network element sends first policy information to the SMF network element.

The first policy information includes one or more of the following information: the tolerable service delay corresponding to the first service, a policy and charging control (PCC) rule, or the second indication information.

The policy and charging control rule may include a data packet forwarding rule, charging rule, or the like that is determined by the PCF network element for the first service.

The second indication information indicates the SMF network element to perform, for the first service, a corresponding action (for example, perform S705) in the data packet transmission method in this embodiment of this application.

S705: The SMF network element sends an N4 session establishment/modification request to a UPF network element.

The N4 session establishment/modification request may carry one or more of the following information: the tolerable service delay, a packet detection rule (PDR), or the third indication information.

The packet detection rule may include a forwarding action rule (FAR), a quality of service (QoS) enforcement rule (QoS enforcement rule, QER), a usage reporting rule (URR), or the like corresponding to the data packet.

The third indication information indicates the UPF network element to perform, for the first service, a corresponding action (for example, performing some or all steps in S707 to S713, or performing some or all steps in S715 to S717) in the data packet transmission method in this embodiment of this application.

The SMF network element selects the UPF network element for the UE based on information such as load, a location, and a capacity of each UPF network element, and sends the N4 session establishment request message to the selected UPF network element. The SMF network element configures a PDR for data transmission and the like for the UPF network element by establishing an N4 session.

S706: The UPF network element sends an N4 session response message to the SMF network element.

A PDU session establishment/modification procedure may be completed by performing S702 to S706.

S707: The AS device adds corresponding identification information to the data packet of the first service.

Step S707 is an optional step. The data packet carries the identification information added by the AS device, so that after receiving the data packet, the UPF network element can identify a type of the data packet, and can further identify a corresponding function of the data packet in a decoding process of the data packet of the first service.

In an implementation, the AS device may add corresponding identification information to each data packet of the first service.

In another implementation, the AS device may add corresponding identification information to a data packet that is in a header of a plurality of consecutive same data packets, to reduce an amount of information carried in another data packet. For example, if the first service is a video service, the AS device may add identification information to the $1^{st}$ data packets of different frames of pictures, and other data packets may not carry identification information. For example, for data packets 1, 2, 3, 4, and 5, it is assumed that the data packets 1, 2, and 3 belong to a first frame (where an I frame is used as an example), and the data packets 4 and S belong to a second frame. A corresponding I-frame identifier may be added to the data packet 1, and a corresponding P-frame identifier may be added to the packet 4, to ensure that a network side can determine frame types corresponding to the other data packets based on the identification information and sequence information carried in the data packets.

S708: The UPF network element receives a first data packet of the first service from the AS device.

The first data packet is any data packet that is of the first service and that is received by the UPF network element from the AS device.

S709: The UPF network element receives a second data packet of the first service from the AS device.

S710: The UPF network element checks the second data packet.

If the check succeeds, step S711 is performed. If the check fails, step S712.

Optionally, the UPF network element may check the second data packet based on a checksum carried in the second data packet.

S711: The UPF network element sends the second data packet to the UE.

The UPF network element may receive the second data packet in a process of receiving the data packet of the first service, or may not receive the second data packet. Steps S709 to S711 are optional steps. If optional steps S709 to S711 are not performed, the UPF network element may perform S712 after S708.

It should be understood that, if performing S711, the UPF network element may further perform S712, or may not perform S712. For example, when the UE fails to receive the second data packet, the UE may perform S712. When the UE successfully receives the second data packet, the UE does not perform S712.

S712: The UPF network element determines first sequence information of the second data packet, and records the first sequence information.

The second data packet in S712 is a to-be-discarded data packet that is determined by the UPF network element for the first service, and the first sequence information indicates a sequence of the second data packet.

Optionally, the first sequence information of the second data packet may be determined by the UPF network element based on the tolerable service delay.

In a manner, if the UPF network element has received the second data packet and has sent the second data packet to the UE, the UPF network element may determine the first sequence information of the second data packet based on the tolerable service delay and waiting duration for acknowledge information corresponding to the second data packet. In another manner, the UPF network element may determine the first sequence information of the second data packet based on the tolerable service delay and waiting duration of the second data packet.

In a further optional manner, the second data packet may include a first target data packet, and the first sequence information determined by the UPF network element based on the tolerable service delay may be first sequence information of the first target data packet. The UPF network element may further determine, based on the first sequence information and identification information that are of the first target data packet, first sequence information of another second data packet that is affected by discarding of the first target data packet and on which the terminal device cannot successfully perform service processing.

In another further optional manner, when the first target data packet does not carry the identification information, the UPF network element may perform coding layer analysis and identification on the first target data packet, and determine, based on the first sequence information of the first target data packet and a result of the coding layer analysis and identification, first sequence information of another second data packet that is affected by discarding of the first target data packet and on which the terminal device cannot successfully perform service processing.

The two further optional manners may be a part of S712, or may be steps performed after S712, and are independent of steps S713 and S714 performed for the first target data packet. The UPF network element may independently perform steps S713 and S714 for the another second data packet determined based on the first target data packet.

For step S712 in which the UPF network element determines the first sequence information of the first target data packet and the specific further implementations of determining the another second data packet affected by discarding of the first target data packet, corresponding descriptions are provided in step S401 in the embodiment corresponding to FIG. 4. Refer to the corresponding implementations. Details are not described herein again.

S713: The UPF network element determines a third data packet.

The third data packet carries the first sequence information. The third data packet may be a null data packet, or may be a data packet whose data length is less than a data length of the second data packet.

Optionally, the UPF network element adds a length of the second data packet to the third data packet. For example, if the second data packet is a TCP packet, the third data packet is also a TCP packet, and the length of the second data packet may be added to an optional field in TCP protocol header information of the third data packet.

Optionally, the UPF network element determines a first checksum for the third data packet, and includes the first checksum in the third data packet.

For a further specific implementation in which the UPF network element determines the third data packet, refer to the implementation of step S402 in the embodiment corresponding to FIG. 4. Details are not described herein again.

S714: The UPF network element sends the third data packet to the UE.

S715: The UE performs service processing on the third data packet.

Because the third data packet carries the first sequence information, after receiving the third data packet carrying the first sequence information, the UE considers that the second data packet has arrived, and performs service processing on the third data packet, for example, delivering the third data packet from a TCP layer to an application layer for decoding.

Optionally, the UE checks the third data packet based on the first checksum of the third data packet, and performs service processing on the third data packet when the check succeeds.

S716: The UPF network element receives the second data packet from the AS device.

S717: The UPF network element discards the second data packet.

After S714, the UPF network element may receive the second data packet, or may not receive the second data packet. Therefore, steps S716 and S717 are optional steps. If the second data packet is received in S716, the UPF network element performs S717.

S718: The UPF network element deletes the recorded first sequence information.

Step S718 is an optional step. Optionally, the UPF network element may delete the recorded first sequence information when receiving acknowledge information corresponding to the third data packet, or the UPF network element may delete the recorded first sequence information after specific duration starting from recording of the first sequence information.

In this embodiment of this application, in a process of receiving the data packet of the first service, the UPF network element may determine the first sequence information of the second data packet discarded for the first service, and determine the third data packet carrying the first sequence information. The third data packet is sent to the UE, so that the UE can perform service processing on a following data packet of the second data packet, to avoid freezing of the first service caused by waiting for the second data packet by the UE, and improve continuity and real-time performance of the first service.

Figure 9:
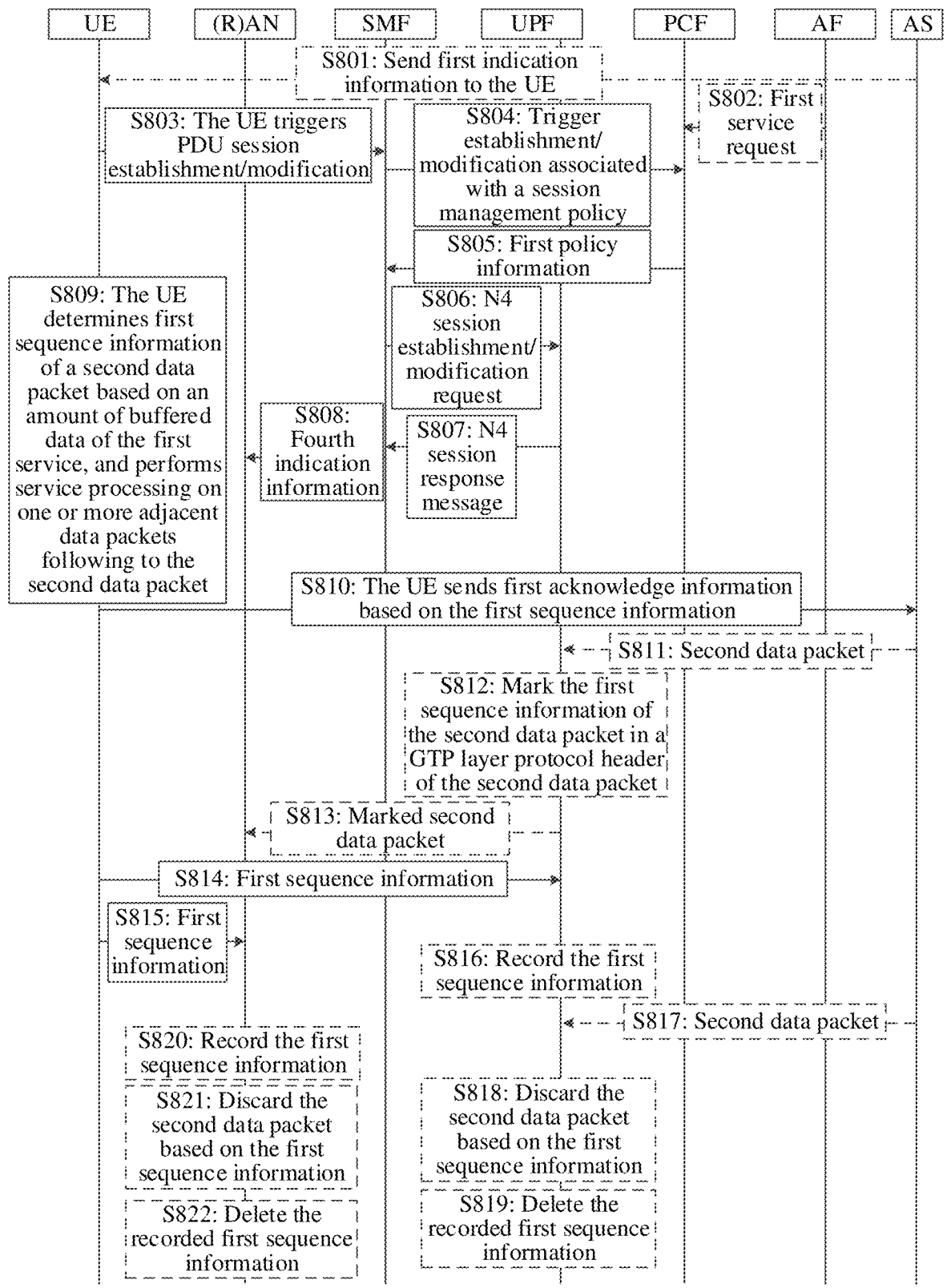
FIG. 9 is a schematic flowchart of yet another data packet transmission method according to an embodiment of this application.

FIG. 9 is a schematic flowchart of another data packet transmission method according to an embodiment of this application. The data packet transmission method shown in FIG. 9 may also be applied to a scenario of PDU session establishment/modification triggered by UE. As shown in FIG. 9, the method may include some or all steps in steps S801 to S820. It should be noted that, in the embodiment corresponding to FIG. 9, a first service request and the first service request in the embodiment corresponding to FIG. 8 are service requests carrying different information; first indication information, second indication information, third indication information, and fourth indication information and objects having same names in the embodiment corresponding to FIG. 4, FIG. 7, or FIG. 8 are different objects having different indication functions, and first policy information and the first policy information in the embodiment corresponding to FIG. 8 are policy information including different information.

S801: An AS device sends first application information to the UE.

Step S801 is an optional step. The first application information may include information for indicating the UE to perform, for the first service, a corresponding action (for example, performing S809 to S812) in the data packet transmission method in this embodiment of this application.

Optionally, the first application information may further include media identifier type information. For the media identifier type information, refer to the corresponding descriptions in the embodiment corresponding to FIG. 8. Details are not described again.

In this method, when optional step S801 is not performed, function enhancement may also be performed on the UE, so that the UE can perform the corresponding action in the data packet transmission method in this embodiment of this application for the first service. Alternatively, the media identifier type information may be preconfigured for the UE through preconfiguration.

S802: An AF network element sends the first service request to a PCF network element.

Step S802 is an optional step. The first service request may include one or more of the following information: the first indication information or flow description information.

The first indication information may indicate the PCF network element to perform, for the first service, a corresponding action (where for example, after S804, the PCF network element performs S805) in the data packet transmission method in this embodiment of this application. For descriptions of the flow description information, refer to the corresponding descriptions in the embodiment corresponding to FIG. 8. Details are not described again.

S803: The UE triggers establishment/modification of a PDU session to an SMF network element.

For an implementation of step S803, refer to the implementation of step S702 in the embodiment corresponding to FIG. 8. Details are not described again.

S804: The SMF network element triggers establishment/modification associated with a session management policy to the PCF network element.

S805: The PCF network element sends the first policy information to the SMF network element.

The first policy information includes one or more of the following information: a policy and charging control rule or the second indication information. For descriptions of the policy and charging control rule, refer to the corresponding descriptions in the embodiment corresponding to FIG. 8. Details are not described again. The second indication information indicates the SMF network element to perform, for the first service, a corresponding action (for example, perform S806 or S808) in the data packet transmission method in this embodiment of this application.

S806: The SMF network element sends an N4 session establishment/modification request to a UPF network element.

The N4 session establishment/modification request may carry one or more of the following information: a packet detection rule or the third indication information. For descriptions of the packet detection rule, refer to the corresponding descriptions in the embodiment corresponding to FIG. 8. Details are not described again. The third indication information indicates the UPF network element to perform, for the first service, a corresponding action (for example, perform some or all steps in S816 to S819) in the data packet transmission method in this embodiment of this application.

S807: The UPF network element sends an N4 session response message to the SMF network element.

A PDU session establishment/modification procedure may be completed by performing S803 to S807.

S808: The SMF network element sends the fourth indication information to a (R)AN device.

The fourth indication information indicates the (R)AN device to perform, for the first service, a corresponding action (for example, perform some or all steps in S820 to S822) in the data packet transmission method in this embodiment of this application. Optionally, the fourth indication information may be included in N2 SM information and sent to the (R)AN device via an AMF network element.

S809: The UE determines first sequence information of a second data packet based on an amount of buffered data of the first service, and performs service processing on one or more adjacent data packets following the second data packet.

The second data packet in S809 is a to-be-discarded data packet determined by the UE for the first service, and the first sequence information indicates a sequence of the second data packet.

Optionally, when the amount of buffered data of the first service is less than a first threshold, the UE may obtain first sequence information of one or more data packets that are of the first service and that are sorted first in data packets on which service processing is not performed.

Further, optionally, a data packet of the first service may carry identification information (namely, one type of identification information included in the media identifier type information). The second data packet may include a first target data packet. The first sequence information determined by the UE based on the amount of buffered data of the first service is first sequence information of the first target data packet. The UE may further determine, based on the first sequence information of the first target data packet and the identification information, first sequence information of another second data packet on which a terminal device cannot successfully perform service processing due to discarding of the first target data packet. The further optional manner may be a part of S809, or may be a step performed after S809, and is independent of steps S810 and S814 and S815 performed for the first target data packet. The UPF network element may independently perform S810 and S814 and S815 for the another second data packet determined based on the first target data packet.

For a further specific implementation of determining the first sequence information by the UE in step S809, refer to the manner of determining the first sequence information by the terminal device in step 601 in the embodiment corresponding to FIG. 7. Details are not described herein again.

S810: The UE sends first acknowledge information to the AS device based on the first sequence information.

The first acknowledge information indicates that the terminal device has received the data packet carrying the first sequence information.

For a further specific implementation of sending the first acknowledge information by the UE based on the first sequence information in step S810, refer to the manner of sending the first acknowledge information by the terminal device based on the first sequence information in step S602 in the embodiment corresponding to FIG. 7. Details are not described herein again.

S811: The UPF network element receives the second data packet from the AS device.

S812: The UPF network element marks the first sequence information of the second data packet in a GTP layer protocol header of the second data packet.

Further, after receiving the second data packet in S811, the UPF network element may obtain the first sequence information from the second data packet, and mark the first sequence information in the GTP layer protocol header of the second data packet. For example, the UPF network element may obtain the first sequence information from a TCP layer protocol header of the second data packet, and mark the first sequence information in the GTP protocol header.

S813: The UPF network element sends a marked second data packet to the (R)AN device.

Steps S811 to S813 are optional steps before step S814. For example, before the UPF network element receives the first sequence information sent by the UE, if the UPF network element receives the second data packet in S811, steps S812 and S813 may be performed.

The UPF network element performs marking at a GTP layer of the second data packet by performing step 811 to S813. Therefore, after the (R)AN device receives the first sequence information sent by the UE, if the (R)AN device receives the second data packet sent by the UPF network element (for example, receives the second data packet in an ARQ (automatic repeat request, automatic repeat request) process for an RLC (radio link control) layer of the second data packet or receives the second data packet in a HARQ (hybrid automatic repeat request) process for a MAC (media access control) layer of the second data packet), the (R)AN device may obtain the first sequence information from the GTP layer of the second data packet, and discard the second data packet.

S814: The UE sends the first sequence information to the UPF network element.

The first sequence information sent by the UE to the UPF network element indicates the UPF network element to discard the second data packet after receiving the second data packet after S814. Optionally, the first sequence information may be included in acknowledge information sent by the UE to the UPF network element last time, and sent to the UPF network element, or may be included in another uplink data packet and sent to the UPF network element.

The UE sends the first sequence information to the UPF network element by performing step S814, so that when the UPF network element receives the second data packet after receiving the first sequence information, the UPF network element discards the second data packet. This avoids a waste of transmission resources caused by transmission of the second data packet by the UPF network element.

S815: The UE sends the first sequence information to the (R)AN device.

The first sequence information sent by the UE to the (R)AN device indicates the (R)AN device to discard the second data packet after receiving the second data packet after S815. Optionally, the first sequence information may be included in acknowledge information sent by the UE to the (R)AN device last time, and sent to the (R)AN device. Further, the first sequence information may be marked in PDCP (packet data convergence protocol) layer protocol header information of the acknowledge information sent by the UE to the (R)AN device last time. Alternatively, the first sequence information may be included in other information, for example, RCC (radio resource control) information, and sent to the (R)AN device.

The UE sends the first sequence information to the (R)AN device by performing step S815, so that when the (R)AN device receives the second data packet after receiving the first sequence information, the (R)AN device discards the second data packet. This avoids a waste of transmission resources caused by transmission of the second data packet by the (R)AN device.

An execution sequence of S814 is irrelevant to that of S815.

S816: The UPF network element records the first sequence information.

Step S816 may be performed after step S814, and is irrelevant to the execution sequence of S815.

S817: The UPF network element receives the second data packet from the AS device.

S818: The UPF network element discards the second data packet based on the first sequence information.

After step S815, the UPF network element may receive the second data packet, or may not receive the second data packet. Therefore, steps S817 and S818 are optional steps.

S819: The UPF network element deletes the recorded first sequence information.

Step S819 is an optional step. In an optional manner, the UPF network element may perform S819 after receiving the second data packet in S817. In another optional manner, if the UPF network element does not perform S817 after S815, the UPF network element may delete the recorded first sequence information after specific duration starting from recording of the first sequence information.

S820: The (R)AN device records the first sequence information.

Step S820 may be performed after step S815, and is irrelevant to execution sequences of S816 to S819.

S821: The (R)AN device discards the second data packet based on the first sequence information.

Step S821 may be performed when the (R)AN device receives the marked second data packet sent by the UPF network element in step S813, the second data packet has not been sent to the UE, and the UPF network element receives the first sequence information in S815.

Optionally, the (R)AN device may obtain information marked in the GTP protocol header of the second data packet, and discard the second data packet when the information marked in the GTP protocol header matches the first sequence information.

S822: The (R)AN device deletes the recorded first sequence information.

Step S822 is an optional step. In an optional manner, the (R)AN device may perform S822 when the (R)AN device receives the marked second data packet sent by the UPF network element in step S813, the second data packet has not been sent to the UE, and the UPF network element receives the first sequence information in S815. In another optional manner, if the (R)AN device does not receive the second data packet after S815, the (R)AN device may delete the recorded first sequence information after specific duration starting from recording of the first sequence information.

In this embodiment of this application, in a process of receiving the data packet of the first service, the UE may determine, based on a packet loss policy, the first sequence information of the second data packet discarded for the first service. Then, the UE may send the first acknowledge information to the application server based on the first sequence information, and decode a following data packet of the second data packet, to reduce freezing of the first service, and ensure continuity and real-time performance of the first service.

Figure 10:
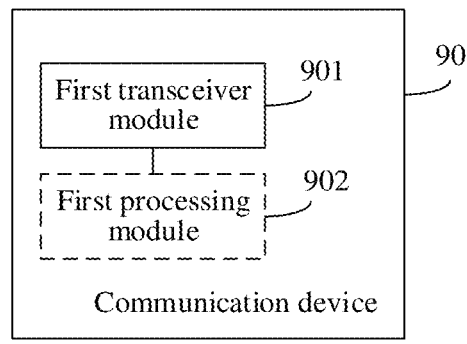
FIG. 10 is a schematic diagram of a structure of a communication device according to an embodiment of this application.

The foregoing describes the data packet transmission method provided in embodiments of this application. The following describes related devices in the method. First, FIG. 10 is a schematic diagram of a structure of a communication device according to an embodiment of this application. As shown in FIG. 10, the communication device 90 includes at least a first transceiver module 901 and a first processing module 902.

The first transceiver module 901 is configured to receive a first data packet of a first service from an application server.

The first processing module 902 is configured to determine first sequence information of a second data packet. The second data packet is a data packet discarded for a first service, and the first sequence information indicates a sequence of the second data packet.

The first processing module 902 is further configured to determine a third data packet. The third data packet includes the first sequence information.

The first transceiver module 901 is further configured to send the third data packet to a terminal device.

In an optional manner, the second data packet is a TCP packet, and the first sequence information includes a TCP sequence number of the second data packet.

In another optional manner, the first sequence information is included in first information, and the first information further includes a source IP address, a source port number, a target IP address, and a target port number.

In another optional manner, the first transceiver module 901 is further configured to receive the second data packet after sending the third data packet to the terminal device.

The first processing module 902 is further configured to discard the second data packet.

In another optional manner, the first transceiver module 901 is further configured to receive the first sequence information from a second network element. The second network element is the terminal device or the application server.

The first processing module 902 is configured to obtain the first sequence information from the first transceiver module 901.

In another optional manner, the first transceiver module 901 is further configured to receive first indication information from the second network element. The first indication information indicates that the second data packet is a to-be-discarded data packet.

In another optional manner, the second data packet includes a first target data packet, and the first processing module 902 is configured to:

when the first transceiver module 901 does not receive the first target data packet within a first receiving time limit, or receives acknowledge information corresponding to the first target data packet from the terminal device within a second receiving time limit, obtain first sequence information of the first target data packet.

In another optional manner, the second data packet includes a first target data packet. The first target data packet includes: a data packet that is of the first service and that is not received by the terminal device within a third receiving time limit, and/or one or more data packets that are sorted first in data packets that are not decoded for the first service when data buffered by the terminal device for the first service is less than a first threshold.

In another optional manner, the second data packet further includes a second target data packet determined based on second sequence information of the first target data packet and second indication information of the first target data packet, the second sequence information indicates a sequence of the first target data packet, and the second indication information indicates a coding type corresponding to the first target data packet in the first service.

In another optional manner, the first information further includes third indication information, and the third indication information indicates a length of the data in the second data packet.

In another optional manner, the third data packet further includes a first checksum. The first processing module 902 is further configured to determine the first checksum based on the first information.

In another optional manner, after the first transceiver module 901 sends the third data packet to the terminal device, the first processing module 902 is further configured to:

when the first transceiver module 901 receives first acknowledge information from the terminal device, or after first duration starting from sending of the third data packet to the terminal device by the first transceiver module 901, delete the first sequence information from a first record list. The first acknowledge information indicates that the terminal device has received the data packet carrying the first sequence information. The first record list includes sequence information of a data packet discarded by the terminal device for the first service.

In another optional manner, before the first processing module determines the first sequence information of the second data packet, the first transceiver module 901 is further configured to receive the second data packet, and is further configured to send the second data packet to the terminal device.

The first processing module 902 is further configured to store first information of the second data packet in a second record list. The second record list includes information about a data packet that is of the first service and that is received by the first transceiver module 901.

The first processing module 902 is further configured to: when the first transceiver module 901 receives acknowledge information corresponding to the second data packet within second duration starting from receiving of the second data packet, delete the first sequence information from the second record list.

The first processing module 902 is configured to: when the first transceiver module 901 receives acknowledge information corresponding to the second data packet within second duration starting from receiving of the second data packet, determine the first sequence information of the second data packet.

In another optional manner, the first transceiver module 901 is further configured to receive the second data packet before the first processing module 902 determines the first sequence information of the second data packet.

The first processing module 902 is further configured to: check the second data packet, and if the check fails, discard the second data packet.

It may be understood that the communication device 90 in this embodiment of this application may implement the steps performed by the first network element in the embodiment corresponding to FIG. 4, for example, step S401 or S402, or perform the steps performed by the UE in FIG. 8. For specific implementations of the functional components included in the first network element in FIG. 10 and corresponding beneficial effects, refer to the detailed descriptions of the embodiment in FIG. 4 or FIG. 8.

Figure 11:
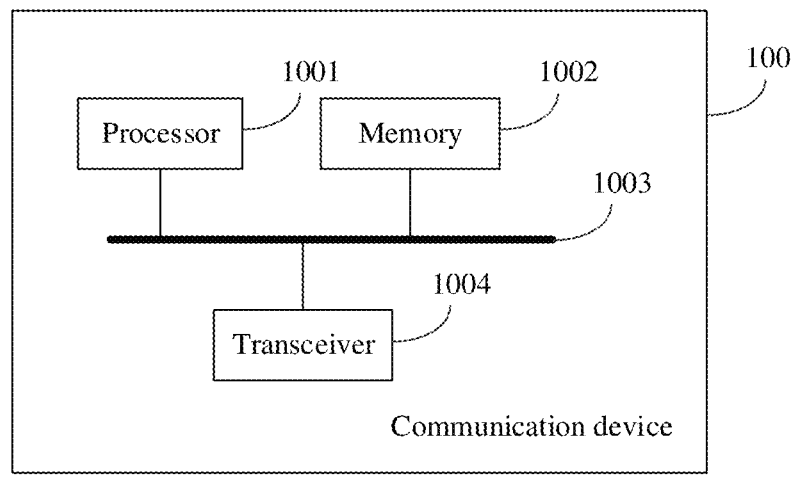
FIG. 11 is a schematic diagram of a structure of another communication device according to an embodiment of this application.

The communication device in the embodiment shown in FIG. 10 may be implemented as a communication device 100 shown in FIG. 11. FIG. 11 is a schematic diagram of a structure of another communication device according to an embodiment of this application. As shown in FIG. 11, the communication device 100 includes a processor 1001, a memory 1002, and a transceiver 1004.

The processor 1001 may be configured to: determine or process first sequence information of a second data packet, determine a third data packet, or the like, for example, implement step S401 or S402 in the embodiment corresponding to FIG. 4.

The memory 1002 is configured to store program code and data that are executed by the communication device 100.

The processor 1001 may execute application program code stored in the memory 1002, to implement an action of the first network element in the embodiment shown in FIG. 4, or implement an action of the UE in the embodiment shown in FIG. 8.

The processor 1001 is communicatively connected to the memory 1002, for example, through a bus 1003. The bus 1003 may be a PCI bus, an EISA bus, or the like. The bus 1003 may be classified into an address bus, a data bus, a control bus, and the like. For ease of representation, only one bold line is used to represent the bus in FIG. 11, but this does not mean that there is only one bus or only one type of bus.

The transceiver 1004 is configured to support information transmission between the communication device 100 and the application server, the terminal device, or another network element in the foregoing embodiments, for example, implement step S400 in the embodiment corresponding to FIG. 4, or implement step S714 or S716 in the embodiment corresponding to FIG. 8.

It should be noted that during actual application, the communication device 100 may include one or more processors, and the structure of the communication device 100 does not constitute a limitation on this embodiment of this application.

The processor 1001 may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

The transceiver 1004 may be a communication interface, a transceiver circuit, or the like. The transceiver is a general term. During specific implementation, the transceiver may include a plurality of interfaces.

The memory 1002 may include a volatile memory, for example, a random access memory (RAM). The memory 1002 may alternatively include a non-volatile memory, for example, a read-only memory (ROM), a flash memory, a hard disk drive (HDD), or a solid-state drive (SSD). The memory 1002 may alternatively include a combination of the foregoing types of memories.

An embodiment of this application further provides a computer storage medium. The computer storage medium may be configured to store computer software instructions used by the communication device 100 in the embodiment shown in FIG. 11, and the computer software instructions include a program designed for the communication device 100 in the foregoing embodiment. The storage medium includes but is not limited to a flash memory, a hard disk drive, or a solid-state drive.

An embodiment of this application further provides a computer program product. When the computer product is run by the communication device shown in FIG. 10 or FIG. 11, the data packet transmission method designed for the communication device 90 in the embodiment shown in FIG. 10 or the data packet transmission method designed for the communication device 100 in the embodiment shown in FIG. 11 may be performed.

Figure 12:
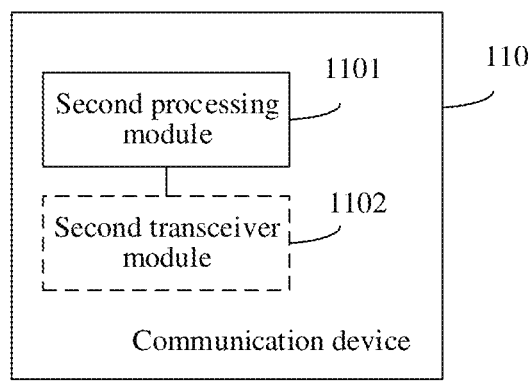
FIG. 12 is a schematic diagram of a structure of still another communication device according to an embodiment of this application.

FIG. 12 is a schematic diagram of a structure of still another communication device according to an embodiment of this application. As shown in FIG. 12, the communication device 110 includes at least a second processing module 1101 and a second transceiver module 1102.

The second processing module 1101 is configured to determine first sequence information of a second data packet. The second data packet is a to-be-discarded data packet of a first service, and the first sequence information indicates a sequence of the second data packet.

The second transceiver module 1102 is configured to send the first sequence information of the second data packet to a first network element. The first sequence information is used to trigger the first network element to determine, in a process of receiving a data packet of the first service from an application server, a third data packet including the first sequence information and send the third data packet to a terminal device.

In an optional manner, the second data packet is a TCP packet, and the first sequence information includes a TCP sequence number of the second data packet.

In another optional manner, the first sequence information is included in first information, and the first information further includes a source IP address, a source port number, a target IP address, and a target port number.

In another optional manner, the second transceiver module 1102 is further configured to send first indication information to the first network element. The first indication information indicates that the second data packet is a discarded data packet.

In another optional manner, the second data packet includes a first target data packet, and the second processing module 1101 is configured to:

when the second transceiver module 1102 does not receive the first target data packet within a third receiving time limit, obtain first sequence information of the first target data packet; or when an amount of data buffered by the communication device for the first service is less than a first threshold, obtain first sequence information of one or more first target data packets that are sorted first in data packets that are not decoded for the first service.

In another optional manner, the second data packet further includes a second target data packet determined based on second sequence information and second indication information that are of the first target data packet, the second sequence information indicates a sequence of the first target data packet, and the second indication information indicates a coding type corresponding to the first target data packet in the first service.

In still another optional manner, the first information further includes third indication information, and the third indication information indicates a length of the second data packet.

It may be understood that the communication device 110 in this embodiment of this application may implement a step performed by the second network element in the embodiment corresponding to FIG. 4, or implement some steps performed by the UE in FIG. 8. For specific implementations of the functional components included in the communication device 110 in FIG. 12 and corresponding beneficial effects, refer to the detailed descriptions of the embodiment in FIG. 4 or FIG. 8.

Figure 13:
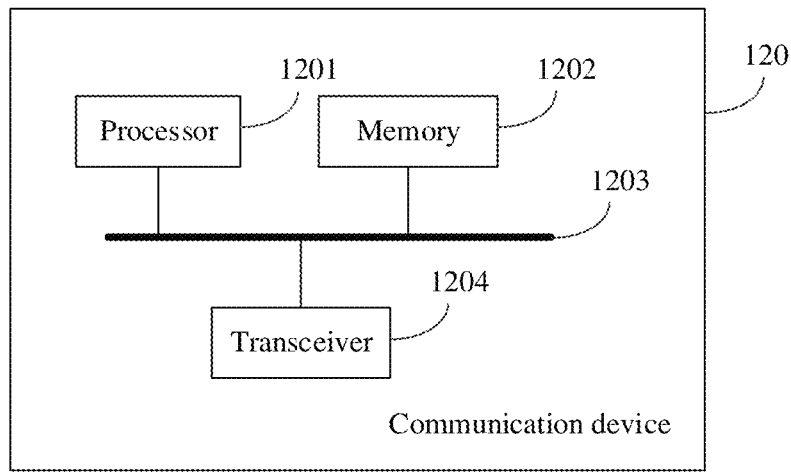
FIG. 13 is a schematic diagram of a structure of yet another communication device according to an embodiment of this application.

The communication device in the embodiment shown in FIG. 12 may be implemented as a communication device 120 shown in FIG. 13. FIG. 13 is a schematic diagram of a structure of yet another communication device according to an embodiment of this application. As shown in FIG. 13, the communication device 120 includes a processor 1201, a memory 1202, and a transceiver 1204.

The processor 1201 may be configured to determine first sequence information of a second data packet, for example, determine the first sequence information of the second data packet sent to the first network element in the embodiment corresponding to FIG. 4.

The memory 1202 is configured to store program code and data that are executed by the communication device 120. The processor 1201 may execute application program code stored in the memory 1202, to implement a step performed by the second network element in the embodiment in FIG. 4.

The processor 1201 is communicatively connected to the memory 1202, for example, through a bus 1203. The bus 1203 may be a PCI bus, an EISA bus, or the like. The bus 1203 may be classified into an address bus, a data bus, a control bus, and the like. For ease of representation, only one bold line is used to represent the bus in FIG. 13, but this does not mean that there is only one bus or only one type of bus.

The transceiver 1204 is configured to support information transmission between the communication device 120 and the first network element or another network element in the foregoing embodiments, for example, transmission of the first sequence information of the second data packet to the first network element.

It should be noted that during actual application, the communication device 120 may include one or more processors, and the structure of the communication device 120 does not constitute a limitation on this embodiment of this application.

The processor 1201 may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

The transceiver 1204 may be a communication interface, a transceiver circuit, or the like. The transceiver is a general term. During specific implementation, the transceiver may include a plurality of interfaces.

The memory 1202 may include a volatile memory, for example, a random access memory (RAM). The memory 1202 may alternatively include a non-volatile memory, for example, a read-only memory (ROM), a flash memory, a hard disk drive (HDD), or a solid-state drive (SSD). The memory 1202 may alternatively include a combination of the foregoing types of memories.

An embodiment of this application further provides a computer storage medium. The computer storage medium may be configured to store computer software instructions used by the communication device in the embodiment shown in FIG. 13, and the computer software instructions include a program designed for the communication device in the foregoing embodiment. The storage medium includes but is not limited to a flash memory, a hard disk drive, or a solid-state drive.

An embodiment of this application further provides a computer program product. When the computer product is run by the communication device shown in FIG. 12 or FIG.

13, the data packet transmission method designed for the communication device 110 in the embodiment shown in FIG. 12 or the data packet transmission method designed for the communication device 120 in the embodiment shown in FIG. 13 may be performed.

Figure 14:
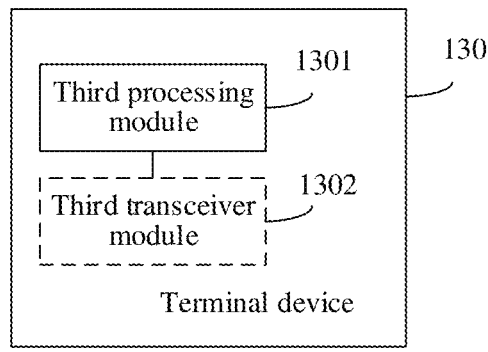
FIG. 14 is a schematic diagram of a structure of a terminal device according to an embodiment of this application.

FIG. 14 is a schematic diagram of a structure of a terminal device according to an embodiment of this application. As shown in FIG. 14, the terminal device 130 includes at least a third processing module 1301 and a third transceiver module 1302.

The third processing module 1301 is configured to determine first sequence information of a second data packet based on a packet loss policy. The second data packet is a to-be-discarded data packet of a first service, and the first sequence information indicates a sequence of the second data packet.

The third transceiver module 1302 is configured to send first acknowledge information to an application server based on the first sequence information. The first acknowledge information indicates that the terminal device has received the data packet carrying the first sequence information.

In an optional manner, after the third processing module 1301 determines the first sequence information of the second data packet based on the packet loss policy, the third transceiver module 1302 is further configured to receive the second data packet carrying the first sequence information.

The third processing module 1301 is further configured to discard the second data packet.

In another optional manner, the third processing module 1301 is further configured to: when the third transceiver module 1302 receives the second data packet carrying the first sequence information, or after third duration starting from determining of the first sequence information by the third processing module 1301, delete the first sequence information from a third record list.

The third record list includes information about a data packet discarded by the terminal device for the first service.

In another optional manner, after the third processing module 1301 determines the first sequence information of the second data packet based on the packet loss policy, the third transceiver module 1302 is further configured to send the first sequence information to a third network element. The first sequence information is used to trigger the third network element to discard the second data packet when receiving the second data packet.

In another optional manner, the second data packet is a TCP packet, and the first sequence information includes a TCP sequence number of the second data packet.

In another optional manner, the second data packet includes a first target data packet, and the third processing module 1301 is configured to:

when the third transceiver module 1302 does not receive the first target data packet within a third receiving time limit, obtain first sequence information of the first target data packet; or when an amount of data buffered by the terminal device for the first service is less than a first threshold, obtain first sequence information of one or more first target data packets that are sorted first in data packets that are not decoded for the first service.

In another optional manner, the second data packet further includes a second target data packet, and the third processing module 1301 is further configured to:

determine the second target data packet based on second sequence information and second indication information that are of the first target data packet, where the second sequence information indicates a sequence of the first target data packet, and the second indication information indicates a coding type corresponding to the first target data packet in the first service.

In still another optional manner, the third transceiver module 1302 is further configured to send fourth indication information to the application server. The fourth indication information indicates that the first acknowledge information is sent by the terminal device when the terminal device does not receive the second data packet.

It may be understood that the terminal device 130 in this embodiment of this application may implement a step performed by the terminal device in the embodiment corresponding to FIG. 7, for example, step S601, or perform a step performed by the UE in FIG. 9. For specific implementations of the functional components included in the terminal device 130 in FIG. 14 and corresponding beneficial effects, refer to the detailed descriptions of the embodiment in FIG. 4 or FIG. 9.

Figure 15:
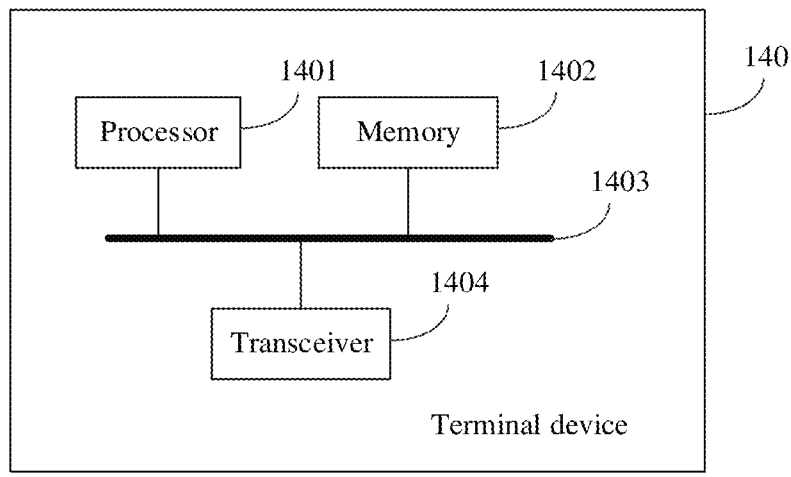
FIG. 15 is a schematic diagram of a structure of another terminal device according to an embodiment of this application.

The terminal device 130 in the embodiment shown in FIG. 14 may be implemented as a terminal device 140 shown in FIG. 15. FIG. 15 is a schematic diagram of a structure of another terminal device according to an embodiment of this application. As shown in FIG. 15, the terminal device 140 includes a processor 1401, a memory 1402, and a transceiver 1404.

The processor 1401 may be configured to determine first sequence information of a second data packet, for example, implement step S601 in the embodiment corresponding to FIG. 6.

The memory 1402 is configured to store program code and data that are executed by the terminal device 140. The processor 1401 may execute application program code stored in the memory 1402, to implement an action of the terminal device in the embodiment corresponding to FIG. 6, or implement an action of the UE in FIG. 8.

The processor 1401 is communicatively connected to the memory 1402, for example, through a bus 1403. The bus 1403 may be a PCI bus, an EISA bus, or the like. The bus 1403 may be classified into an address bus, a data bus, a control bus, and the like. For ease of representation, only one bold line is used to represent the bus in FIG. 15, but this does not mean that there is only one bus or only one type of bus.

The transceiver 1404 is configured to support information transmission between the terminal device 140 and the application server, the first network element, or another network element in the foregoing embodiments, for example, implement step S602 in the embodiment corresponding to FIG. 6, or implement step S815 in the embodiment corresponding to FIG. 8.

It should be noted that, during actual application, the terminal device 140 may include one or more processors, and the structure of the terminal device 140 does not constitute any limitation on this embodiment of this application.

The processor 1401 may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

The transceiver 1404 may be a communication interface, a transceiver circuit, or the like. The transceiver is a general term. During specific implementation, the transceiver may include a plurality of interfaces.

The memory 1402 may include a volatile memory, for example, a random access memory (RAM). The memory 1402 may alternatively include a non-volatile memory, for example, a read-only memory (ROM), a flash memory, a hard disk drive (HDD), or a solid-state drive (SSD). The memory 1402 may alternatively include a combination of the foregoing types of memories.

An embodiment of this application further provides a computer storage medium. The computer storage medium may be configured to store computer software instructions used by the terminal device 140 in the embodiment shown in FIG. 15, and the computer software instructions include a program designed for the terminal device 140 in the foregoing embodiment. The storage medium includes but is not limited to a flash memory, a hard disk drive, or a solid-state drive.

An embodiment of this application further provides a computer program product. When the computer product is run by the terminal device shown in FIG. 14 or FIG. 15, the data packet transmission method designed for the terminal device 130 in the embodiment shown in FIG. 14 or the data packet transmission method designed for the terminal device 140 in the embodiment shown in FIG. 15 may be performed.

Figure 16:
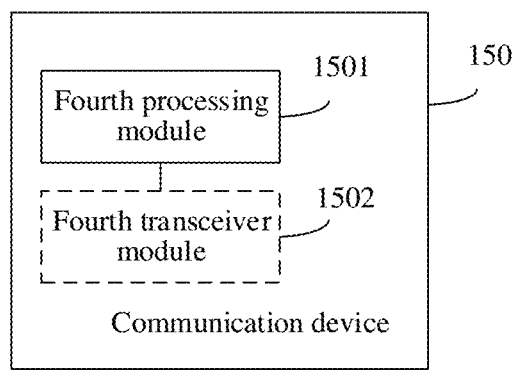
FIG. 16 is a schematic diagram of a structure of still yet another communication device according to an embodiment of this application.

FIG. 16 is a schematic diagram of a structure of still yet another communication device according to an embodiment of this application. As shown in FIG. 16, the communication device 150 includes at least a fourth transceiver module 1501 and a fourth processing module 1502.

The fourth transceiver module 1501 is configured to receive first sequence information from a terminal device. The first sequence information indicates a sequence of a second data packet, and the second data packet is a to-be-discarded data packet of a first service.

The fourth transceiver module 1501 is further configured to receive, from an application server, the second data packet carrying the first sequence information.

The fourth processing module 1502 is configured to discard the second data packet.

In an optional manner, the fourth transceiver module 1501 is further configured to receive a fourth data packet.

The fourth processing module 1502 is further configured to mark third sequence information of the fourth data packet in a GTP layer protocol header of the fourth data packet. The third sequence information of the fourth data packet includes information indicating a sequence of the fourth data packet.

The fourth transceiver module 1501 is further configured to send a marked fourth data packet to an access network device.

In another optional manner, the fourth processing module 1502 is configured to:

obtain sequence information marked in a GTP layer protocol header of the second data packet, and discard the second data packet when the information marked in the GTP layer protocol header matches the first sequence information.

In still another optional manner, after the fourth transceiver module 1501 receives the first sequence information from the terminal device, the fourth processing module 1502 is further configured to:

when the fourth transceiver module 1501 receives the second data packet carrying the first sequence information, or after fourth duration starting from receiving of the first sequence information by the fourth transceiver module 1501, delete the first sequence information from a fourth record list.

The fourth record list includes sequence information of a data packet discarded by the terminal device for the first service.

It may be understood that the communication device 150 in this embodiment of this application may implement a step performed by the third network element in the embodiment corresponding to FIG. 7, or some steps performed by the UPF network element or the (R)AN device in FIG. 9. For specific implementations of the functional components included in the communication device 150 in FIG. 6 and corresponding beneficial effects, refer to the detailed descriptions of the embodiment in FIG. 7 or FIG. 9.

Figure 17:
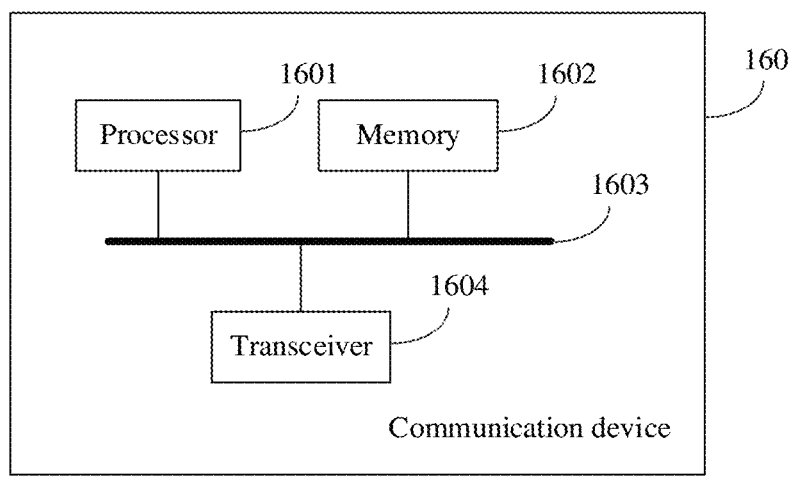
FIG. 17 is a schematic diagram of a structure of a further communication device according to an embodiment of this application.

The communication device in the embodiment shown in FIG. 16 may be implemented as a communication device 160 shown in FIG. 17. FIG. 17 is a schematic diagram of a structure of a further communication device according to an embodiment of this application. As shown in FIG. 17, the communication device 160 includes a processor 1601, a memory 1602, and a transceiver 1604.

The processor 1601 may be configured to discard a second data packet based on first sequence information, for example, perform S818 in the embodiment corresponding to FIG. 8.

The memory 1602 is configured to store program code and data that are executed by the communication device 160. The processor 1601 may execute application program code stored in the memory 1602, to implement a step performed by the third network element in the embodiment in FIG. 6.

The processor 1601 is communicatively connected to the memory 1602, for example, through a bus 1603. The bus 1603 may be a PCI bus, an EISA bus, or the like. The bus 1603 may be classified into an address bus, a data bus, a control bus, and the like. For ease of representation, only one bold line is used to represent the bus in FIG. 17, but this does not mean that there is only one bus or only one type of bus.

The transceiver 1604 is configured to support information transmission between the communication device 160 and the terminal device or another network element in the foregoing embodiments, for example, receiving of the first sequence information of the second data packet from the terminal device.

It should be noted that during actual application, the communication device 160 may include one or more processors, and the structure of the communication device 160 does not constitute a limitation on this embodiment of this application.

The processor 1601 may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

The transceiver 1604 may be a communication interface, a transceiver circuit, or the like. The transceiver is a general term. During specific implementation, the transceiver may include a plurality of interfaces.

The memory 1602 may include a volatile memory, for example, a random access memory (RAM). The memory 1602 may alternatively include a non-volatile memory, for example, a read-only memory (ROM), a flash memory, a hard disk drive (HDD), or a solid-state drive (SSD). The memory 1602 may alternatively include a combination of the foregoing types of memories.

An embodiment of this application further provides a computer storage medium. The computer storage medium may be configured to store computer software instructions used by the communication device in the embodiment shown in FIG. 17, and the computer software instructions include a program designed for the communication device in the foregoing embodiment. The storage medium includes but is not limited to a flash memory, a hard disk drive, or a solid-state drive.

An embodiment of this application further provides a computer program product. When the computer product is run by the communication device shown in FIG. 16 or FIG. 17, the data packet transmission method designed for the communication device 150 in the embodiment shown in FIG. 16 or the data packet transmission method designed for the communication device 160 in the embodiment shown in FIG. 17 may be performed.

An embodiment of this application further provides a data packet transmission system. The data packet transmission system includes the communication device 90 in the embodiment corresponding to FIG. 10 and the communication device 110 in the embodiment corresponding to FIG. 12, to implement the data packet transmission method in embodiments of this application.

An embodiment of this application further provides another data packet transmission system. The data packet transmission system includes the communication device 100 in the embodiment corresponding to FIG. 11 and the communication device 120 in the embodiment corresponding to FIG. 13, to implement the data packet transmission method in embodiments of this application.

An embodiment of this application further provides still another data packet transmission system. The data packet transmission system includes the terminal device 130 in the embodiment corresponding to FIG. 14 and the communication device 150 in the embodiment corresponding to FIG. 16, to implement the data packet transmission method in embodiments of this application.

An embodiment of this application further provides yet another data packet transmission system. The data packet transmission system includes the terminal device 140 in the embodiment corresponding to FIG. 15 and the communication device 160 in the embodiment corresponding to FIG. 17, to implement the data packet transmission method in embodiments of this application.

Figure 18:
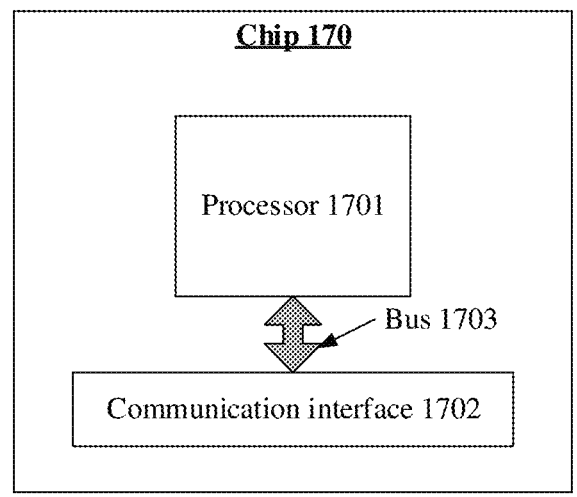
FIG. 18 is a schematic diagram of a structure of a communication chip according to an embodiment of this application.

FIG. 18 is a schematic diagram of a structure of a communication chip according to an embodiment of this application. As shown in FIG. 18, the communication chip 170 may include a processor 1701 and one or more communication interfaces 1702 coupled to the processor 1701.

The processor 1701 may be configured to read and execute computer-readable instructions. In specific implementation, the processor 1701 may mainly include a controller, an arithmetic unit, and a register. The controller is mainly responsible for decoding instructions and sending a control signal for an operation corresponding to the instructions. The arithmetic unit is mainly responsible for performing a fixed-point or floating-point arithmetic operation, a shift operation, a logic operation, and the like, and may also perform an address operation and address translation. The register is mainly responsible for saving a quantity of register operations, intermediate operation results, and the like that are temporarily stored during instruction execution. During specific implementation, a hardware architecture of the processor 1701 may be an application-specific integrated circuit (ASIC) architecture, an MIPS architecture, an ARM architecture, an NP architecture, or the like. The processor 1701 may be a single-core or multi-core processor.

The interface 1702 may be configured to input a to-be-processed signal or data to the processor 1701, and may output a processing result of the processor 1701 to the outside. For example, the communication interface 1702 may be a general-purpose input/output (GPIO) interface, and may be connected to a plurality of peripheral devices (for example, a display (LCD), a camera, and a radio frequency (RF) module). The communication interface 1702 is connected to the processor 1701 through a bus 1703.

In this application, the processor 1701 may be configured to invoke, from a memory, an implementation program of the terminal device in the data packet transmission method provided in one or more embodiments of this application, and execute instructions included in the program; configured to invoke, from a memory, an implementation program of the first network element in the data packet transmission method provided in one or more embodiments of this application, and execute instructions included in the program; or configured to invoke, from a memory, an implementation program of the second network element in the data packet transmission method provided in one or more embodiments of this application, and execute instructions included in the program; or configured to invoke, from a memory, an implementation program of the third network element in the data packet transmission method provided in one or more embodiments of this application, and execute instructions included in the program. The communication interface 1702 may be configured to output an execution result of the processor 1701. In this application, the communication interface 1702 may be configured to: input first sequence information of a second data packet, output the first sequence information of the second data packet that is obtained by the processor 1701 through processing, or the like. For the data packet transmission method provided in one or more embodiments of this application, refer to the embodiments shown in FIGS. 4 and FIG. 7 to FIG. 9. Details are not described herein again.

It should be noted that a function corresponding to each of the processor 1701 and the communication interface 1702 may be implemented by using a hardware design, may be implemented by using a software design, or may be implemented by a combination of software and hardware. This is not limited herein.

In the specification, claims, and accompanying drawings of this application, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

A person of ordinary skill in the art may understand that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

What is claimed is:

1. A data packet transmission method, comprising:
receiving, by a first network element, a first data packet of a first service from an application server;
determining, by the first network element, first sequence information of a second data packet, wherein the first sequence information indicates a sequence of the second data packet, the second data packet is a to-be-discarded data packet of the first service, the second data packet comprises a first target data packet and a second target data packet determined based on second sequence information of the first target data packet and second indication information of the first target data packet, and the second indication information indicates a coding type corresponding to the first target data packet in the first service;
determining, by the first network element, a third data packet, wherein the third data packet comprises the first sequence information; and
sending, by the first network element, the third data packet to a terminal device.

2. The data packet transmission method according to claim 1, wherein the second data packet is a transmission control protocol (TCP) packet, and the first sequence information comprises a TCP sequence number of the second data packet.

3. The data packet transmission method according to claim 1, wherein the first sequence information is included in first information, and the first information further comprises a source internet protocol (IP) address, a source port number, a target IP address, and a target port number.

4. The data packet transmission method according to claim 3, wherein the first information further comprises third indication information, and the third indication information indicates a length of the second data packet.

5. The data packet transmission method according to claim 1, wherein after the sending, by the first network element, the third data packet to the terminal device, the method further comprises:
receiving, by the first network element, the second data packet; and
discarding, by the first network element, the second data packet.

6. The data packet transmission method according to claim 1, wherein the determining, by the first network element, the first sequence information of the second data packet comprises:
receiving, by the first network element, the first sequence information from a second network element, wherein the second network element is the terminal device or the application server.

7. The data packet transmission method according to claim 6, further comprising:
receiving, by the first network element, first indication information from the second network element, wherein the first indication information indicates that the second data packet is the to-be-discarded data packet.

8. The data packet transmission method according to claim 6, wherein
the second data packet comprises a first target data packet, and the first target data packet comprises one or more of:
a data packet that is of the first service and that is not received by the terminal device within a third receiving time limit; or
one or more data packets that are sorted first in data packets that are not decoded for the first service when data buffered by the terminal device for the first service is less than a first threshold.

9. The data packet transmission method according to claim 1, wherein
the determining, by the first network element, the first sequence information of the second data packet comprises:
in response to the first network element not receiving the first target data packet within a first receiving time limit, or in response to the first network element not receiving acknowledge information corresponding to the first target data packet from the terminal device within a second receiving time limit, obtaining first sequence information of the first target data packet.

10. The data packet transmission method according to claim 9, wherein the second sequence information indicates a sequence of the first target data packet.

11. The data packet transmission method according to claim 1, wherein after the sending, by the first network element, the third data packet to the terminal device, the method further comprises:
in response to the first network element receiving first acknowledge information from the terminal device, or in response to a first duration starting from sending of the third data packet to the terminal device, deleting, by the first network element, the first sequence information from a first record list,
wherein
the first acknowledge information indicates that the terminal device has received the data packet carrying the first sequence information, and
the first record list comprises sequence information of a data packet discarded by the first network element for the first service.

12. The data packet transmission method according to claim 1, wherein before the determining, by the first network element, the first sequence information of the second data packet, the method further comprises:
receiving, by the first network element, the second data packet;
sending, by the first network element, the second data packet to the terminal device;
storing the first sequence information of the second data packet in a second record list, wherein the second record list comprises information about a data packet that is of the first service and that is received by the first network element; and
in response to the first network element receiving acknowledge information corresponding to the second data packet within a second duration starting from receiving of the second data packet, deleting, by the first network element, the first sequence information from the second record list; or
in response to the first network element not receiving acknowledge information corresponding to the second data packet within the second duration starting from receiving of the second data packet, determining, by the first network element, the first sequence information of the second data packet.

13. A data packet transmission method, comprising:
determining, by a second network element, first sequence information of a second data packet, wherein the first sequence information indicates a sequence of the second data packet, the second data packet is a to-be-discarded data packet of a first service, the second data packet comprises a first target data packet and a second target data packet determined based on second sequence information of the first target data packet and second indication information of the first target data packet, and the second indication information indicates a coding type corresponding to the first target data packet in the first service; and sending, by the second network element, the first sequence information of the second data packet to a first network element, wherein the first sequence information is used to trigger the first network element to determine, in a process of receiving a data packet of the first service from an application server, a third data packet comprising the first sequence information and send the third data packet a terminal device.

14. The data packet transmission method according to claim 13, wherein the second data packet is a transmission control protocol (TCP) packet, and the first sequence information comprises a TCP sequence number of the second data packet.

15. The data packet transmission method according to claim 13, wherein the first sequence information is comprised in first information, and the first information further comprises a source internet protocol (IP) address, a source port number, a target IP address, and a target port number.

16. The data packet transmission method according to claim 13, wherein the method further comprises:
sending, by the second network element, first indication information to the first network element, wherein the first indication information indicates that the second data packet is the to-be-discarded data packet.

17. The data packet transmission method according to claim 13, wherein
the determining, by the second network element, the first sequence information of the second data packet comprises:
in response to the second network element not receiving the first target data packet within a third receiving time limit, obtaining, by the second network element, first sequence information of the first target data packet; or
in response to an amount of buffered data of the first service being less than a first threshold, obtaining, by the second network element, first sequence information of one or more first target data packets that are sorted first in data packets that are not decoded for the first service.

18. The data packet transmission method according to claim 17, wherein the second sequence information indicates a sequence of the first target data packet.

19. A communication apparatus, comprising:
a processor; and
a memory having instructions stored thereon that, when executed by the processor, cause the communication apparatus to:
receive a first data packet of a first service from an application server;
determine first sequence information of a second data packet, wherein the first sequence information indicates a sequence of the second data packet, the second data packet is a to-be-discarded data packet of the first service, the second data packet comprises a first target data packet and a second target data packet determined based on second sequence information of the first target data packet and second indication information of the first target data packet, and the second indication information indicates a coding type corresponding to the first target data packet in the first service;
determine a third data packet, wherein the third data packet comprises the first sequence information; and
send the third data packet to a terminal device.

20. A communication apparatus, comprising:
a processor; and
a memory having instructions stored thereon that, when executed by the processor, cause the communication apparatus to:
determine first sequence information of a second data packet, wherein the first sequence information indicates a sequence of the second data packet, the second data packet is a to-be-discarded data packet of a first service, the second data packet comprises a first target data packet and a second target data packet determined based on second sequence information of the first target data packet and second indication information of the first target data packet, and the second indication information indicates a coding type corresponding to the first target data packet in the first service; and
send the first sequence information of the second data packet to a first network element, wherein the first sequence information is used to trigger the first network element to determine, in a process of receiving a data packet of the first service from an application server, a third data packet comprising the first sequence information and send the third data packet to a terminal device.

* * * * *